United States Patent
Shao et al.

(10) Patent No.: US 12,111,441 B2
(45) Date of Patent: Oct. 8, 2024

(54) DATA DRIVEN APPROACH TO DEVELOP PETROPHYSICAL INTERPRETATION MODELS FOR COMPLEX RESERVOIRS

(71) Applicant: Halliburton Energy Services, Inc., Houston, TX (US)

(72) Inventors: Wei Shao, Houston, TX (US); Songhua Chen, Houston, TX (US); Huiwen Sheng, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 132 days.

(21) Appl. No.: 17/936,803

(22) Filed: Sep. 29, 2022

(65) Prior Publication Data

US 2023/0324579 A1 Oct. 12, 2023

Related U.S. Application Data

(60) Provisional application No. 63/270,000, filed on Mar. 28, 2022.

(51) Int. Cl.
*G01V 3/26* (2006.01)
*E21B 43/25* (2006.01)
*G01V 3/34* (2006.01)

(52) U.S. Cl.
CPC .............. *G01V 3/26* (2013.01); *E21B 43/25* (2013.01); *G01V 3/34* (2013.01)

(58) Field of Classification Search
CPC ........ G01V 3/26; E21B 43/25; E21B 2200/20
See application file for complete search history.

(56) References Cited

U.S. PATENT DOCUMENTS 10,197,697 B2 2/2019 Shao et al.
10,895,659 B2 1/2021 Reiderman et al.
(Continued)

FOREIGN PATENT DOCUMENTS

EP 2761331 B1 10/2018

OTHER PUBLICATIONS

International Search Report and Written Opinion for International Application No. PCT/US2022/077308 dated Jan. 20, 2023.

*Primary Examiner* — Lee E Rodak
*Assistant Examiner* — Zannatul Ferdous
(74) *Attorney, Agent, or Firm* — John Wustenberg; C. Tumey Law Group PLLC

(57) ABSTRACT

System and methods of petrophysical modeling are disclosed. Measurements of formation parameters are received from one or more measurement tools during a first stage of a downhole operation within a reservoir formation. A correlation between each of the formation parameters and a target parameter of the formation is determined based on the measurements. One or more formation parameters are selected as input parameters for a symbolic regression model, based on the correlation. A symbolic regression model is trained to generate candidate formation models representing the target parameter, based on the selected input parameters. One or more optimizations are applied to the candidate models to determine a target petrophysical model of the formation. Values of the target parameter are estimated for at least one formation layer, based on the target petrophysical model. A second stage of the downhole operation is performed within the formation layer(s) based on the estimated values.

20 Claims, 25 Drawing Sheets

(56) References Cited

U.S. PATENT DOCUMENTS

| | | |
|---|---|---|
| 10,969,513 B2 | 4/2021 | Shao et al. |
| 11,062,439 B2 | 7/2021 | Pattnaik et al. |
| 11,143,781 B2 | 10/2021 | Li et al. |
| 11,169,295 B2 | 11/2021 | Miller et al. |
| 11,353,619 B2 | 6/2022 | Chen et al. |
| 2010/0211536 A1 | 8/2010 | Al-Fattah |
| 2013/0080066 A1* | 3/2013 | Al-Dossary ............ G01V 1/306 702/11 |
| 2015/0177352 A1 | 6/2015 | Li et al. |
| 2017/0138871 A1 | 5/2017 | Li et al. |
| 2017/0146692 A1* | 5/2017 | Yu ........................... E21B 47/12 |
| 2017/0176361 A1 | 6/2017 | Shao et al. |
| 2017/0241921 A1 | 8/2017 | Chen et al. |
| 2018/0120471 A1 | 5/2018 | Chen et al. |
| 2018/0164465 A1 | 6/2018 | Chen, IV et al. |
| 2019/0284910 A1 | 9/2019 | Amr et al. |
| 2020/0040719 A1 | 2/2020 | Maniar et al. |
| 2021/0190989 A1 | 6/2021 | Cheng et al. |
| 2021/0349001 A1* | 11/2021 | Anifowose ............ G01V 20/00 |

\* cited by examiner

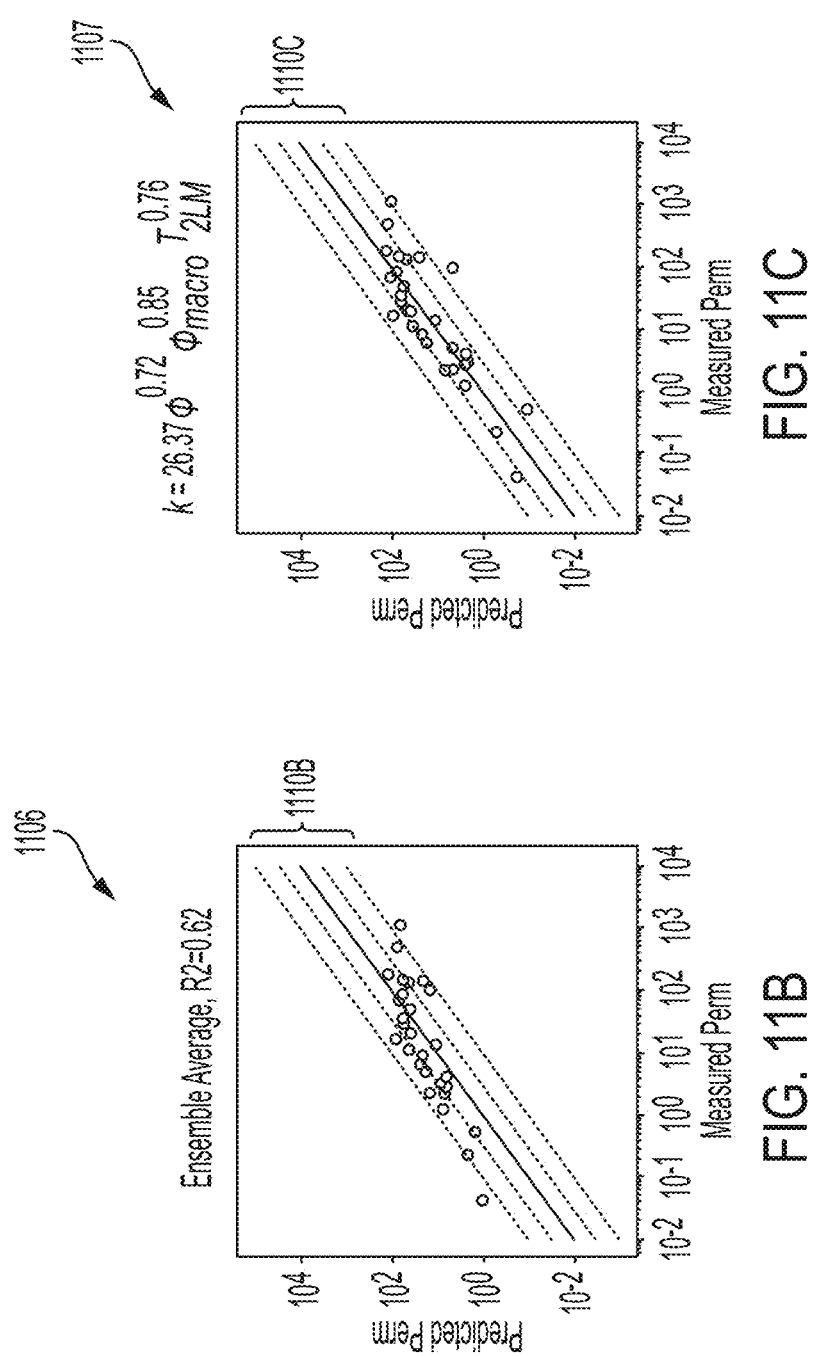

| Environmental parameters | Measured fluid properties | Target parameters |
|---|---|---|
| $T$: temperature | $\rho(T)$: fluid density | GOR: gas-oil ratio |
| $P$: pressure | $\gamma_{sat}$: saturated compressibility | $\mu_{sat}$: saturation viscosity |
| | $API^0$: specific gravity | API Gravity |
| | $\rho_{CH4}(P,T)$: CH$_4$ density | |
| | $\gamma_{CH4}(P,T)$: CH$_4$ compressibility | |
| | $\gamma_{oil}(P,T)$: oil compressibility | |

FIG. 15

DATA DRIVEN APPROACH TO DEVELOP PETROPHYSICAL INTERPRETATION MODELS FOR COMPLEX RESERVOIRS

CROSS-REFERENCE TO RELATED APPLICATIONS

This application claims priority to U.S. Provisional Application No. 63/270,000, filed on Mar. 28, 2022, the benefit of which is claimed and the disclosure of which is incorporated herein by reference in its entirety.

FIELD OF THE DISCLOSURE

The present disclosure relates generally to petrophysical modeling and particularly, to modeling petrophysical rock properties and fluid saturations of heterogeneous hydrocarbon bearing reservoir formations.

BACKGROUND

In the field of hydrocarbon exploration and production, downhole logging tools are often used to measure the collective response of a subterranean formation, including its rock matrix and pore fluid responses. Such downhole tools may rely on a variety of physics principles to propagate signals through the formation and measure the formation's response to the propagated signals. Examples of such principles include, but are not limited to, nuclear, electromagnetic, magnetic resonance, acoustic, and optical wave physics. The responses measured by such downhole tools may include, but are not limited to, acoustic velocities, electrical resistivities, and nuclear magnetic resonance (NMR) transverse-relaxation-time ($T_2$) distribution. For example, a downhole electromagnetic resistivity logging while drilling (LWD) tool may use a transmitting antenna to generate electromagnetic fields in a surrounding formation, which induce a voltage response that can be measured by multiple receiving antennas along an axis of the tool. The response of the formation is converted into a set of inversion parameters, which are then used to estimate various petrophysical properties, e.g., permeability, porosity, and fluid saturation, of the formation, which is useful for ascertaining the presence or absence of fluids, such as hydrocarbons. Such petrophysical properties typically are not direct outputs of the logging sensors but can be derived from the tool measurements via interpretation equations or models.

For reservoir formations having relatively unform lithology and mineralogy, the development of a petrophysical interpretation model to estimate petrophysical properties of a reservoir rock formation often starts with laboratory analysis of core samples obtained from the formation. For more complex and heterogeneous reservoirs, however, petrophysicists may have difficulty using conventional empirical approaches to model formation parameters and estimate properties rock properties from well logging. Such reservoir formations may have several formation beddings with lithology and mineralogy characteristics that continually vary by depth, and empirical models may be inadequate to account for such variation. In addition to the continuous variation, the complexity of such models originates from the fact that the correlations between the logging tool measurements and the petrophysical parameters are often non-linear. As measurements acquired using different logging sensors tend to be based on different tool physics, manually combining such multi-physics measurement data to form a non-linear empirical model or equation may be problematic. Most machine learning or deep learning techniques are used to predict values of petrophysical parameters, rather than predict an equation or model representing such parameters. Parameter values by themselves are insufficient to gain an understanding of how the physics of a particular downhole tool used to acquire the measurements affect the formation's response with respect to the individual petrophysical parameters being measured. Furthermore, a pure data analytics approach to machine learning often requires a significant amount of training data, which can be expensive and onerous to obtain.

BRIEF DESCRIPTION OF THE DRAWINGS

FIG. 11B is a plot graph showing the performance of an ensemble model produced by averaging the three target petrophysical models of FIG. 11A.

FIG. 11C is a plot graph showing the performance of another ensemble model that combines the three models of FIG. 11A using a logarithmic operation.

FIG. 15 is a table showing input variables and target parameters that may be selected for a target petrophysical model of a reservoir formation.

DESCRIPTION OF ILLUSTRATIVE EMBODIMENTS

Figure 1:
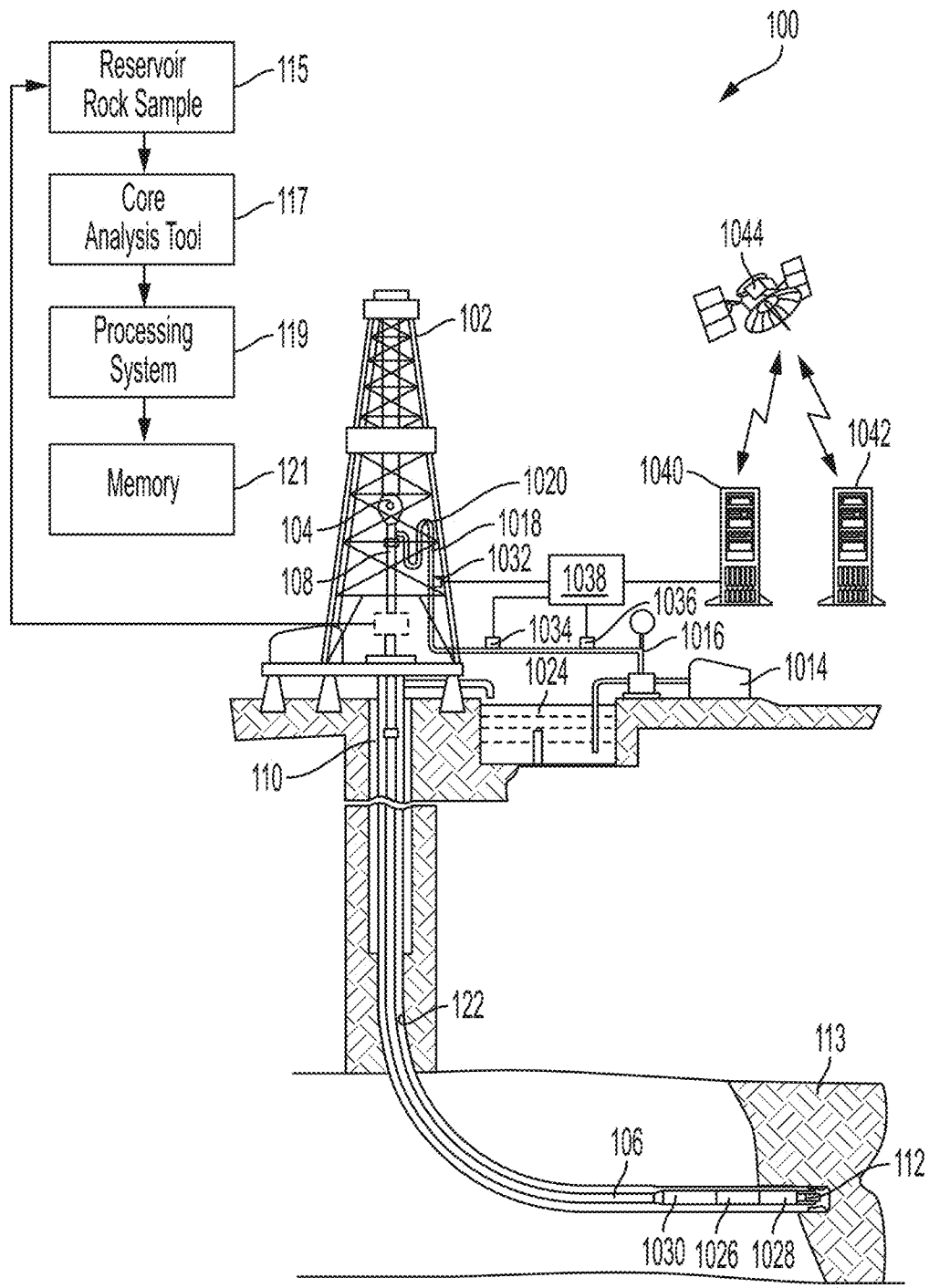
FIG. 1 is a diagram of an illustrative drilling system in which embodiments of the present disclosure may be implemented.

Embodiments of the present disclosure relate to petrophysical modeling of heterogeneous or unconventional reservoir formations. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

As will be described in further detail below, embodiments of the present disclosure utilize symbolic regression (SR) and machine learning to develop a petrophysical model of a hydrocarbon-bearing reservoir formation that represents the underlying physics of both the formation and the measurement devices used to collect data from the formation. In some embodiments, a systematic multi-featured approach may be used to develop petrophysical interpretation models of a heterogeneous formation. Such models may be defined by, for example, corresponding mathematical equations or functions, the parameters of which may represent different sets of formation parameters.

In some embodiments, the disclosed petrophysical modeling techniques may be characterized by the following five features representing different constituent parts of a model-development workflow: (1) statistical analysis for correlating different reservoir formation parameters and selecting optimal candidate input parameters for one or more target petrophysical models (also referred to herein as "petrophysical interpretation models," "petrophysical models," "target formation models," "formation models," or "target models") of the formation; (2) symbolic regression (SR), such as genetic programming based SR, for integrating multi-physics measurement data from various data sources and training a machine learning (ML) model (also referred to herein as a "symbolic regression model" or "SR model") to develop the target petrophysical model(s); (3) ensemble modeling for utilizing all available training data by integrating multiple instances of model prediction equations objectively, which may be especially useful for relatively small training datasets; (4) a conditional branching technique, which can be applied with the aforementioned SR and ML modeling techniques, for producing multiple target models representing different types of formation heterogeneity; and (5) a model discrimination framework for evaluating multiple factors (e.g., mathematical complexity, measurement complexity, physics complexity, and model performance) to select an optimal target model from multiple target models that may be produced by the trained SR/ML model. However, it should be appreciated that embodiments are not intended to be limited to these features and that the disclosed techniques may be adapted to include any number of features as desired for a particular implementation, e.g., based on the available data for model building purposes.

It should also be appreciated that one or more of the above-listed features may be optional and therefore, excluded from the model-development workflow, as desired for a particular implementation. While various embodiments of the present disclosure will be described in the context of genetic programming-based SR, it should be appreciated that embodiments are not intended to be limited thereto and that the disclosed petrophysical modeling techniques may be applied using other types of SR algorithms, such as the AI Feynman or AI Feynman 2.0 SR algorithms proposed in Udrescu et al., "AI Feynman: A physics-inspired method for symbolic regression." *Science Advances* 6 (2020) (available at https://arxiv.org/pdf/1905.11481.pdf) and Udrescu et al., "AI Feynman 2.0: Pareto-optimal symbolic regression exploiting graph modularity." *ArXiv* abs/2006.10782 (2020) (available at https://arxiv.org/pdf/2006.10782.pdf), respectively, which are incorporated herein by reference in their entireties.

Illustrative embodiments and related methodologies of the present disclosure are described below in reference to FIGS. 1-15 as they might be employed in, for example, a computer system for reservoir modeling and well planning. Other features and advantages of the disclosed embodiments will be or will become apparent to one of ordinary skill in the art upon examination of the following figures and detailed description. It is intended that all such additional features and advantages are included within the scope of the disclosed embodiments. Further, the illustrated figures are only exemplary and are not intended to assert or imply any limitation with regard to the environment, architecture, design, or process in which different embodiments may be implemented.

FIG. 1 is a diagram of an illustrative drilling system 100. In accordance with the present disclosure, the drilling system 100 may be used to retrieve a reservoir rock sample, such as a core sample, for characterization of a reservoir. The drilling system 100 may be one in which embodiments of the present disclosure may be implemented as part of a downhole operation performed at a wellsite. For example, the disclosed petrophysical modeling techniques may be performed as part of an overall seismic or other data (e.g., nuclear magnetic resonance (NMR) data) interpretation and well planning workflow for one or more downhole operations at a wellsite. Such downhole operations may include, but are not limited to, drilling, completion, and injection stimulation operations for recovering petroleum, oil and/or gas, deposits from a hydrocarbon bearing reservoir rock formation. As shown in FIG. 1, drilling system 100 includes a drilling platform equipped with a derrick 102 that supports a hoist 104. Drilling in accordance with some embodiments is carried out by a string of drill pipes connected by "tool" joints to form a drill string 106. Hoist 104 suspends a top drive 108 that is used to rotate drill string 106 as the hoist lowers the drill string through wellhead 110. Connected to the lower end of drill string 106 is a drill bit 112 for drilling a wellbore 122 through a reservoir formation 113.

In some embodiments, drill string 106 may also include a reservoir rock sample collection tool (not shown) located near drill bit 112 for retrieving reservoir rock samples as the wellbore 122 is drilled through the formation. The reservoir rock sample collection tool may be designed to retrieve a reservoir rock sample 115 cut from the reservoir formation 113 by drill bit 112 as wellbore 122 is drilled through the formation. It should be appreciated that the reservoir rock sample collection tool may use any suitable mechanism to extract or collect the rock sample 115 from the formation 113. In some embodiments, the sample 115 may be cut from a side of the wellbore 122 by a separate rock extraction tool included in the reservoir rock sample collection tool and placed in a hollow storage chamber of the collection tool for later retrieval and analysis at the surface of the wellbore.

Further, in some embodiments, the collection of rock sample 115 and drilling of the wellbore 122 through rotation of the drill bit 112 may be accomplished by rotating drill string 106. The drill string 106 may be rotated by the top drive 108 or by use of a downhole "mud" motor near the drill bit 112 that independently turns the drill bit 112 or by a combination of both the top drive 108 and a downhole mud motor. During the drilling process, drilling fluid may be pumped by a mud pump 1014 through a flow line 1016, a stand pipe 1018, a goose neck 1020, top drive 108, and down through drill string 106 at high pressures and volumes to emerge through nozzles or jets in drill bit 112. The drilling fluid then travels back up the wellbore 122 via an annulus formed between the exterior of drill string 106 and the wall of wellbore 1022, through a blowout preventer (not specifically shown), and into a mud pit 1024 on the surface. On the surface, the drilling fluid is cleaned and then circulated again by mud pump 1014. The drilling fluid is used to cool drill bit 112, carry cuttings (e.g., including reservoir rock sample 115) from the borehole to the surface, and balance the hydrostatic pressure in the reservoir formation 113.

In some embodiments, the reservoir rock sample 115 retrieved from the wellbore 122 and reservoir formation 113 may be a core sample or a plug sample. As described herein, the term core sample may refer to a reservoir rock sample retrieved directly from a wellbore (e.g., wellbore 122) and/or reservoir formation (e.g., formation 113). In some embodiments a core sample may be generally cylindrical in shape and have dimensions (e.g., a diameter and a length) on the order of tens to hundreds of feet. Further, as described herein, the term plug sample may refer to a reservoir rock sample taken from a core sample (e.g., after the core sample is removed from the wellbore 122). In some embodiments, a plug sample may have a different set of dimensions from the core sample. For instance, a plug sample may have a diameter and/or length on the order of inches or feet. While core samples and plug samples may be described herein as having particular dimensions, it should be appreciated that embodiments are not limited thereto and that a core sample or a plug sample may have any suitable dimensions.

A retrieved reservoir rock sample 115 may be used to characterize certain properties of the reservoir formation 113. In some embodiments, the retrieved reservoir rock sample 115 may be analyzed to determine a porosity of the reservoir formation 113, a presence of certain minerals within reservoir formation 113, an expected fluid flow within of the reservoir formation 113 and/or the like. In some embodiments, such analysis may be performed by physically manipulating (e.g., cutting, coring, and/or the like). Moreover, such analysis may involve the use of a core analysis tool 117, such as a permeameter, to measure or determine the properties of the sample. Additionally or alternatively, images of the reservoir rock sample 115 may be captured using an imaging device, and the resulting image data may be analyzed to determine characteristics of the reservoir formation 113. As an illustrative example, the core analysis tool 117 may be used to perform an imaging scan on the reservoir rock sample 115 to capture image data of the reservoir rock sample. In some embodiments, the image data may include a sequence of two-dimensional (2D) images of the reservoir rock sample 115 that may be combined to form a three-dimensional (3D) image of the reservoir rock sample 115. Further, the image data may include a computed tomography (CT) image, a magnetic resonance imaging (MRI) image, an ultrasound image, and/or the like. Accordingly, the core analysis tool 117 may include a suitable imaging device to capture the image data, such as a computed tomography (CT) imaging device, a microCT imaging device, an MRI imaging device, an ultrasound imaging device, and/or the like. However, it should be appreciated that embodiments are not limited thereto and that any of various imaging devices may be used as desired for a particular implementation.

While the reservoir rock sample 115 and core analysis tool 117 are illustrated proximate the drilling system 100, it should be appreciated that the reservoir rock sample 115 may be transported off location for analysis by the core analysis tool 117. In this regard, the core analysis tool 117 may be within a laboratory or at a separate geographical location away from the wellsite. Additionally or alternatively, the core analysis tool 117 may be performed in the field (e.g., proximate to the wellsite).

As further illustrated, the data from the core analysis tool 117 (e.g., the core analysis data produced by the core analysis tool 117) along with other wellsite data may be provided to a processing system 119 (e.g., a computing system). Such other wellsite data may include, for example and without limitation, production data and/or logging data captured by one or more downhole tools, e.g., a logging while drilling (LWD) tool 1026 and/or a measurement while drilling (MWD) tool 1028, coupled to drill string 106, as will be described in further detail below. The processing system 119 may use the disclosed petrophysical modeling techniques described herein to process the data and generate a model of the reservoir formation 113, which can then be used to estimate the formation's rock properties and fluid saturations. In some embodiments, the processing system 119 may use symbolic regression to train a machine learning (ML) model to predict petrophysical properties of the reservoir formation 113 based on the core analysis data and other wellsite data. The processing system 119 may use the trained ML (or SR) model to determine properties of the reservoir rock sample 115 and/or the reservoir formation 113.

Processing system 119 may be implemented using any type of computing device or system, such as a computer 1040 (as will be described further below), having at least one processor and a memory, such as a memory 121. While processing system 119 and memory 121 are shown separately from each other and separately from computer 1040 in FIG. 1, it should be appreciated that processing system 119 and memory 121 may be separate components that are integrated within computer 1040.

The memory 121 may be any suitable data storage device. Such a data storage device may include any type of recording medium coupled to an integrated circuit that controls access to the recording medium. The recording medium can be, for example and without limitation, a semiconductor memory, a hard disk, or similar type of memory or storage device. In some implementations, memory 121 may be a remote data store, e.g., a cloud-based storage location. The memory 121 may be internal or external to the processing system 119. In some embodiments, memory 121 may be used to store the core analysis data and/or wellsite data received by the processing system 119, e.g., from the core analysis tool 117 and/or the one or more downhole tools.

In accordance with the various embodiments, the one or more downhole tools may be coupled to drill string 106. As described above, such downhole tools may include LWD tool 1026 and MWD tool 1028. The distinction between LWD and MWD is sometimes blurred in the industry, but for purposes of this example, it may be assumed that LWD tool 1026 is used to measure properties of the surrounding formation (e.g., porosity, permeability), and MWD tool 1028 is used to measure properties associated with wellbore 1022 (e.g., inclination, and direction). Tools 1026 and 1028 may be coupled to a telemetry device or module 1030 that transmits data (e.g., well-logging data and/or a variety of sensor data) to the surface. Tools 1026 and 1028 along with telemetry device 1030 may be housed within the bottom hole assembly (BHA) attached to a distal end of drill string 106 within the reservoir formation 113. While the tools 1026 and 1028 are described as an LWD tool and a MWD tool, respectively, any suitable downhole tool may be used. To that end, as used herein, the term "downhole tool" may refer to any suitable tool or instrument used to collect information from the wellbore 122. Such a downhole tool may include any of various sensors used to measure different downhole parameters. Such parameters may include logging data related to the various characteristics of the subsurface formation (e.g., resistivity, radiation, density, porosity, etc.), characteristics (e.g., size, shape, etc.) of the wellbore 122 being drilled through the formation, and/or characteristics of the drill string 106 (e.g., direction, orientation, azimuth, etc.) disposed within the wellbore 122.

In one or more embodiments, telemetry module 1030 may employ any of various communication techniques to send the measurement data collected downhole to the surface. For example, in some cases, telemetry module 1030 may send measurements collected by the downhole tools 1026 and 1028 (or sensors thereof) to the surface using electromagnetic telemetry. In other cases, telemetry module 1030 may send the data by way of electrical or optical conductors embedded in the pipes that make up drill string 106. In yet still other cases, telemetry module 1030 may communicate the downhole measurements by generating pressure pulses that propagate via drilling fluid (e.g., mud) flowing within the drill string 106 at the speed of sound to the surface.

In the mud pulse telemetry example above, one or more transducers, such as transducers 1032, 1034 and/or 1036, may be used to convert the pressure signal into electrical signals for a signal digitizer 1038 (e.g., an analog to digital converter). Additional surface-based sensors (not shown) for collecting additional sensor data (e.g., measurements of drill string rotation (RPM), drilling pressure, mud pit level, etc.) may also be used as desired for a particular implementation. Digitizer 1038 supplies a digital form of the many sensor measurements (e.g., logging data) to computer 1040. Computer 1040 may be implemented using any type of computing device or system, e.g., computer system 2200 of FIG. 22, as will be described in further detail below. Computer 1040 operates in accordance with software (which may be stored on a computer-readable storage medium) to process and decode the received signals, and to perform the petrophysical modeling techniques disclosed herein, e.g., for purposes of estimating reservoir rock properties (including fluid saturation) and predicting operational outcomes using drilling system 100.

In some embodiments, at least a portion of the wellsite data from the downhole tools 1026 and/or 1028 (e.g., logging data) may be forwarded by computer 1040 via a communication network to another computer system 1042, such as a backend computer system operated by an oilfield services provider, for purposes of remotely monitoring and controlling wellsite operations and/or performing the disclosed petrophysical modeling techniques. The communication of data between computer system 1040 and computer system 1042 may be over a local area network, a wide area network, such as the Internet, or, as illustrated in FIG. 1, over a satellite 1044 link.

In one or more embodiments, computer 1040 may function as a control system for monitoring and controlling downhole operations at the wellsite. Computer 1040 may be implemented using any type of computing device having at least one processor and a memory. Computer 1040 may process and decode the digital signals received from digitizer 1038 using an appropriate decoding scheme. For example, the digital signals may be in the form of a bit stream including reserved bits that indicate the particular encoding scheme that was used to encode the data downhole. Computer 1040 can use the reserved bits to identify the corresponding decoding scheme to appropriately decode the data. The resulting decoded telemetry data may be further analyzed and processed by computer 1040 to display useful information to a wellsite operator. For example, a driller could employ computer 1040 to obtain and monitor one or more formation properties of interest before, over the course of, or after a drilling operation. It should be appreciated that computer 1040 may be located at the surface of the wellsite or at a remote location away from the wellsite.

To predict and/or estimate formation properties, such as saturation and rock formation factor, well logging data and/or core analysis data may be employed. These properties may be estimated using, for example, Equation 1 and Equation 2 (also referred to as "Archie's Equations" or "Archie Equations"):

$$F = \frac{R_0}{R_w} = \frac{a}{\phi^m} \quad (1)$$

$$\sigma_t/\sigma_w = \phi^m S_w^n/a. \quad (2)$$

In Equation 1. F is formation resistivity factor, $\phi$ is the total porosity, $R_0$ is resistivity of brine saturated rock, $R_w$ is the resistivity of brine fluid, the constant a is a tortuosity factor, and the constant m is a cementation exponent. In Equation 2, $\sigma_t$ and $\sigma_w$ are the resistivity of total fluid saturated rocks, which can be mixed with hydrocarbon and water, $S_w$ represents water saturation, and n represents a saturation exponent. In some embodiments, Equation 1 is applicable to 100% brine saturated rocks, and Equation 2 may be applicable to rocks saturated with both hydrocarbon and brine.

In some embodiments, development of a well logging data interpretation model begins with core analysis (e.g., data resulting from the analysis performed by core analysis tool 117). For instance, the constant a, the constant m, and/or the saturation exponent n (also referred to as "Archie parameters") may be determined by core analysis. Estimation of formation properties using core analysis and Archie's equations (e.g., Equation 1 and Equation 2) generally works well for clean sandstones (often dubbed "Archie rocks"). For various shaly sands, source rocks containing shale oil and shale gas, or carbonates, which are considered non-Archie rocks, the parameters of Archie equations may be fit to the saturation of these formations using core analysis with variable success. For example, the estimation of petrophysical properties, such as saturation and/or rock formation factor, may be difficult in a reservoir formation with several formation beddings with different lithology or mineralogy characteristics. In such cases, different rock facies (e.g., lithofacies and/or electrical facies) for a given layer of the formation must first be identified (e.g., from logging data, such as image logs and other logging measurements) before determining which set of Archie parameters to apply for interpreting the petrophysical properties of that particular formation layer and each of the identified facies.

Figure 2:
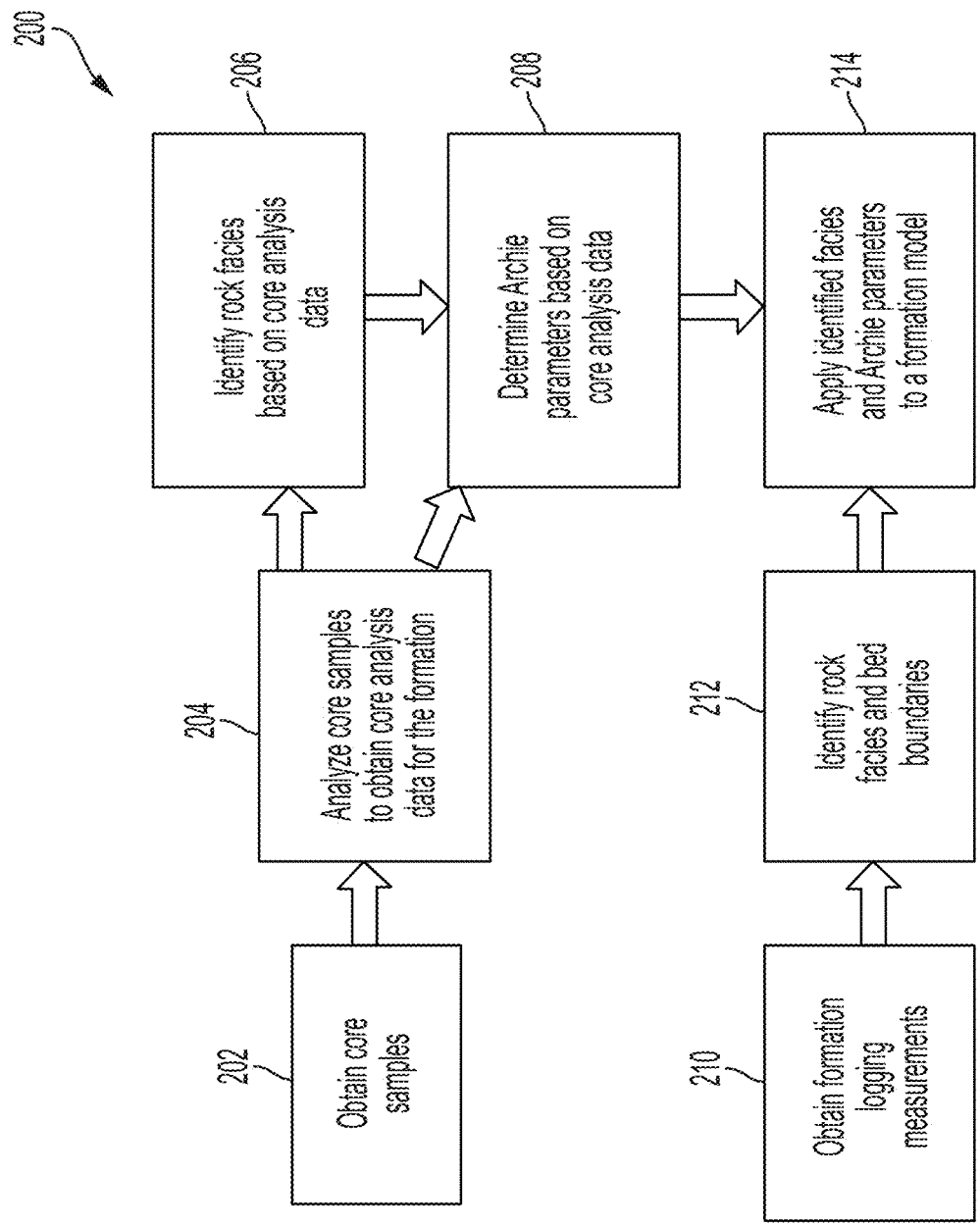
FIG. 2 is a flowchart of an illustrative process for estimating a property of a reservoir formation, in accordance with embodiments of the present disclosure.

Turning now to FIG. 2, a flow diagram of a process 200 for modeling a reservoir formation and estimating formation properties using Archie's equations is illustrated. For discussion purposes, process 200 will be described with reference to drilling system 100 of FIG. 1, as described above. However, process 200 is not intended to be limited thereto.

At block 202, process 200 includes obtaining a core sample, e.g., core plugs, from a reservoir rock formation, e.g., reservoir formation 113 of FIG. 1, as described above. At block 204, the core samples are analyzed to obtain core analysis data for the formation. Such core analysis data may include, for example and without limitation, a series of petrographic thin section images along with measurements of poro-perm, resistivity index (RI), routine core analysis (RCA), and special core analysis (SCA). At least a subset of this core analysis data may then be used to identify lithofacies and/or electric facies (at block 206). The remaining core analysis data may be used to determine Archie parameters (at block 208), e.g., the constants a and m along with the saturation exponent n in Equations 1 and 2, as described above, for each of the identified facies (e.g., lithofacies and/or electric facies). Facies may be identified again (at block 212) for different formation layers from well logging data, which may include image logs, and/or other logging measurements, obtained from the wellsite (at block 210). Subsequently, the facies identified at block 212 may be used to determine which of the Archie parameters from block 208 to apply for interpreting a corresponding layer of the formation (and associated facies thereof). For example, a parameter determined at block 208 for a particular lithofacie and/or electric facie identified at block 206 may be matched to a corresponding formation layer identified from the logging data at block 212. The facies identified in block 212 along with the Archie parameters determined in block 208 may then be applied to a formation model for estimating properties of the formation at block 214.

Therefore, as illustrated in FIG. 2, process 200 may involve two separate identifications of facies (e.g., based on core analysis data at block 206 and logging data at block 212). The separate facie identifications may introduce error and/or inconsistencies, as facies identification may be subject to the opinion of a core analyst and/or a log analyst's opinion. Accordingly, a portion of a reservoir formation may be identified as having a first set of facies based on the core analysis, and the same portion of the formation may be identified as having a different, second set of facies based on the logging data. For instance, the boundaries of facies may differ in the second set in comparison with the first set. As such, Archie's parameters identified for the first set of facies based on core analysis data may not be suitably matched to (e.g., applicable to) the different, second set of facies. Moreover, facies variation across complex, heterogeneous formations could be continuous and mixed facies are possible. Accordingly, a discrete, limited number of facies manually defined by a user or defined without any user intervention, e.g., based on a computer-implemented training or calibration process (e.g., based on fixed parameters), may still be insufficient to model petrophysical properties of the formation. As such, the petrophysical modeling techniques of the present disclosure may be used to develop a model of the formation that can predict or estimate formation properties and saturations based on continuous logs, rather than discrete, facies-based model parameter sets.

Further, in formation evaluation practice, multiple core analysis tools (e.g., core analysis tool 117) or logging instruments (e.g., downhole tools) may be employed to derive the same petrophysical parameters, such as porosity, water saturation, clay volume, formation factor, tortuosity, cementation exponent, or saturation exponent. These different measurement tools may rely on different measurement physics. As such, derivation of the same petrophysical parameter from each of these tools may be treated independently. To that end, how two or more tool measurement inputs may be combined in a single mathematical model to derive a petrophysical parameter may be difficult and unintuitive. Moreover, conventional artificial intelligence (AI) or other data-driven modeling techniques may overfit noise or introduce bias and therefore, may not suitably honor underlying physical, lithological, or mineralogical properties of the formation and/or the tools. In addition, the lack of transparency of such "black-box" approaches makes verification of the suitability of the model (e.g., in terms of honoring the above properties) and identification of the strength of correlation of particular types of measurements (e.g., from a particular tool) in different circumstances difficult. To overcome the shortcomings of such black-box approaches, the modeling techniques of the present disclosure utilize symbolic regression to develop a petrophysical model of the formation for predicting or estimating formation properties and saturations based on a variety of measurement data (e.g., collected by a variety of instruments). The disclosed techniques also account for the measurement physics (e.g., physical properties) of the various instruments (e.g., downhole tools) used to acquire the measurement data and provide a capability to evaluate and refine the model as necessary to improve the accuracy of the prediction of the formation properties and better honor the physical, lithological, or mineralogical properties of the formation and the instruments used to collect data on the formation.

Figure 3:
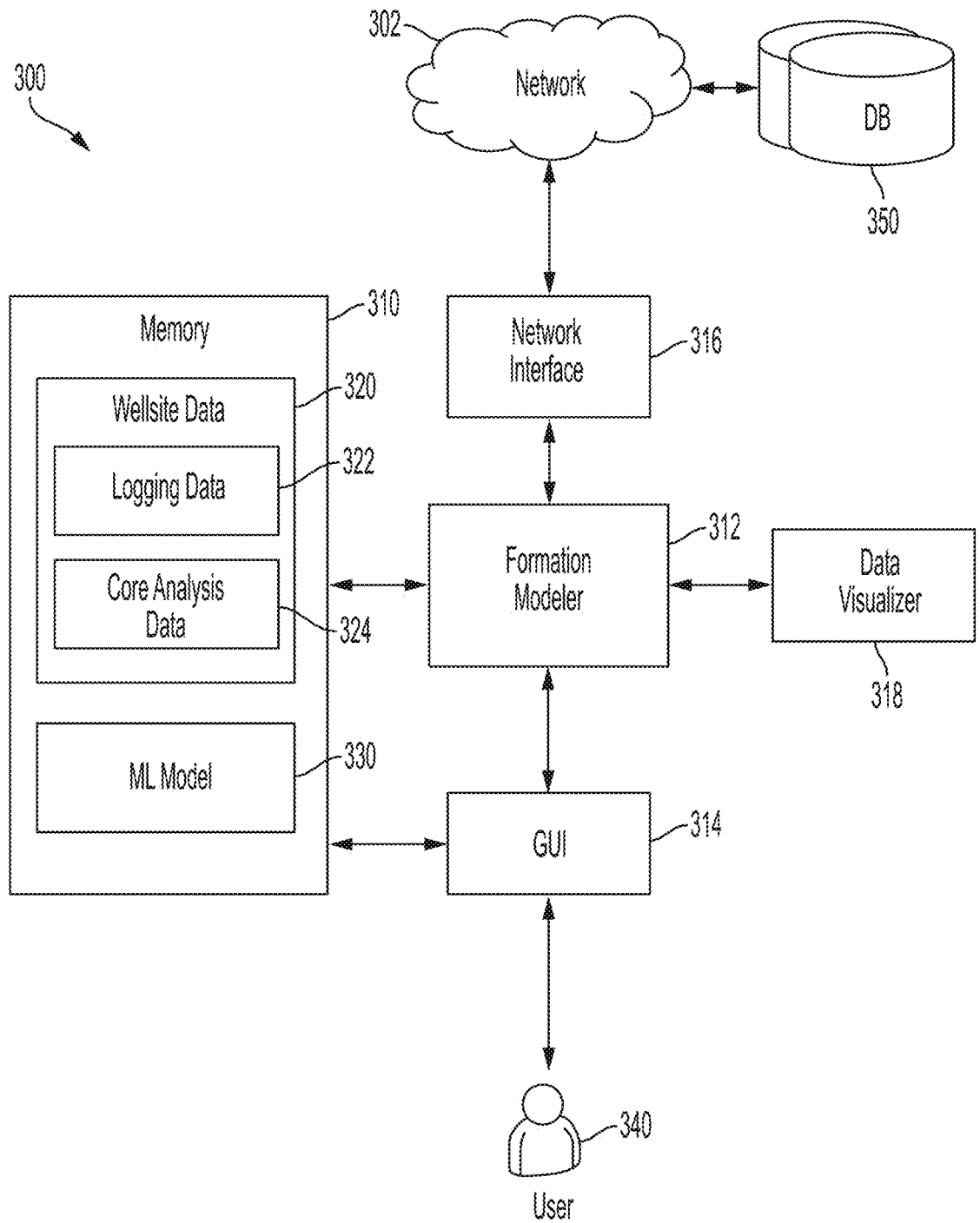
FIG. 3 is a block diagram of an illustrative system in which embodiments of the present disclosure may be implemented.

Turning now to FIG. 3, a block diagram of an exemplary system 300 for modeling a reservoir formation and its petrophysical properties using symbolic regression is illustrated. As shown in FIG. 3, system 300 includes a memory 310, a formation modeler 312, a graphical user interface (GUI) 314, a network interface 316, and a data visualizer 318. In some embodiments, memory 310, formation modeler 312, GUI 314, network interface 316, and data visualizer 318 may be communicatively coupled to one another via an internal bus of system 300. Further, in some embodiments, the components, functions, and/or operations of the system 300 may be included within and/or performed by the processing system 119 and/or the computer 1040 of FIG. 1, as described above.

System 300 may be implemented using any type of computing device having at least one processor and a memory, such as the processing system 119 and/or computer system 1040 of FIG. 1. The memory may be in the form of a processor-readable storage medium for storing data and instructions executable by the processor. Examples of such a computing device include, but are not limited to, a tablet computer, a laptop computer, a desktop computer, a workstation, a mobile phone, a personal digital assistant (PDA), a set-top box, a server, a cluster of computers in a server farm or other type of computing device. In some implementations, system 300 may be a server system located at a data center associated with the hydrocarbon producing field. The data center may be, for example, physically located on or near the field. Alternatively, the data center may be at a remote location away from the hydrocarbon producing field. The computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by each computing device to output or present information to a user via an output device (not shown). The output device may be, for example, a display coupled to or integrated with the computing device for displaying a digital representation of the information being presented to the user.

Although only memory 310, formation modeler 312, GUI 314, network interface 316, and data visualizer 318 are shown in FIG. 3, it should be appreciated that system 300 may include additional components, modules, and/or sub-components as desired for a particular implementation. It should also be appreciated that memory 310, formation modeler 312, GUI 314, network interface 316, and data visualizer 318, may be implemented in software, firmware, hardware, or any combination thereof. Furthermore, it should be appreciated that embodiments of memory 310, formation modeler 312, GUI 314, network interface 316, and data visualizer 318, or portions thereof, can be implemented to run on any type of processing device including, but not limited to, a computer, workstation, embedded system, networked device, mobile device, or other type of processor or computer system capable of carrying out the functionality described herein.

As will be described in further detail below, memory 310 can be used to store information accessible by the formation modeler 312 and/or the GUI 314 for implementing the functionality of the present disclosure. While not shown, the memory 310 can additionally or alternatively be accessed by the data visualizer 318 and/or the like. Memory 310 may be any type of recording medium coupled to an integrated circuit that controls access to the recording medium. The recording medium can be, for example and without limitation, a semiconductor memory, a hard disk, or similar type of memory or storage device. In some implementations, memory 310 may be a remote data store, e.g., a cloud-based storage location, communicatively coupled to system 300 over a network 302 via network interface 316 (e.g., a port, a socket, an interface controller, and/or the like). Network 302 can be any type of network or combination of networks used to communicate information between different computing devices. Network 302 can include, but is not limited to, a wired (e.g., Ethernet) or a wireless (e.g., Wi-Fi or mobile telecommunications) network. In addition, network 302 can include, but is not limited to, a local area network, medium area network, and/or wide area network such as the Internet.

In some embodiments, memory 310 may be used to store wellsite data 320. Wellsite data 320 may include, for example, logging data 322 (e.g., image logs and/or other logging measurements) and core analysis data 324 associated with a reservoir formation, e.g., formation 113 of FIG. 1, as described above. It should be appreciated, however, that embodiments are not limited thereto and that memory 310 may be used to store other types of data (e.g., production data) associated with the reservoir formation (or one or more wellsites thereof). Such data may have been collected by a variety of different tools. Accordingly, logging data 322 in memory 310 may include data collected by any number of downhole logging tools, and core analysis data 324 may have been collected by any number of core analysis tools. The different tools, e.g., core analyzers and well logging instruments, used to collect this data may be characterized by different measurement physics, which may cause the measurement values obtained for the same set of formation properties to vary depending on the tool that is used. Logging data 322 may include, for example, well logging measurements and downhole environment data, as collected by a downhole tool, e.g., LWD tool 1026 and/or MWD tool 1028 of FIG. 1, as described above. Core analysis data 324 may include, for example, NMR data, resistivity data, induction data, acoustic data, pressure-volume-temperature (PVT) data, density data, photoelectric (PE) data, spontaneous potential (SP) data, natural gamma ray data, neutron data, and/or the like, e.g., as obtained from the analysis of a core sample by core analysis tool 117 of FIG. 1, as described above. It should be appreciated that there may be overlap between logging data 322 and core analysis data 324, where measurements of the same type of data may be collected by both the downhole tool and the core analysis tool. In some embodiments, the system 300 may be communicatively coupled to a downhole tool and/or a core analysis tool via network 302. Accordingly, logging data 322 and core analysis data 324 may be obtained from the downhole tool and the core analysis tool, respectively, over network 302 via network interface 316 of system 300. In some embodiments, the wellsite data 320 may be obtained from a remote database (DB) 350, which may be any type of data store that can be accessed over network 302 via the network interface 316.

In one or more embodiments, the formation modeler 312 may utilize symbolic regression for training a machine learning (ML) model 330 to generate a target petrophysical model of the reservoir formation, based on wellsite data 320. The target model generated by the trained ML model (or symbolic regression model) 330 may be formulated as, for example, a mathematical expression, equation, or function representing a target petrophysical parameter of the formation. Such a target formation parameter and corresponding petrophysical model may be representative of the formation's physical and chemical rock properties and their interactions with fluids or the fluid properties within the rock pore space. Examples of such formation properties include, but are not limited to, Archie's parameters, saturation, formation resistivity factor, and/or the like. Thus, wellsite data 320, including logging data 322 and core analysis data 324, in this example may serve as training data for modeling the reservoir formation, i.e., by training ML model 330 to determine an appropriate formation model. As shown in FIG. 3, ML model 330 may also be stored in memory 310. In one or more embodiments, the symbolic regression used by formation modeler 312 may be in the form of a model selection algorithm that is capable of improving a population of candidate models. In one or more embodiments, the underlying algorithm of the symbolic regression may mimic genetic evolution processes that consist of iteratively performing crossover and mutation operations. Crossover may involve randomly merging or combining two candidate models into two new candidate models. Mutation may involve making a random change to at least a part of an individual candidate model to create a new candidate model and associated function. The associated function may be, for example, one of a set of functions/equations or mathematical expressions corresponding to a child population of candidate models. The functions/equations defining the child candidate models may be derived by randomly perturbing or varying one or more parameters of the corresponding functions/equations used to define the models in a parent population. Such parameters may include, for example, one or more coefficients, constants, exponents, etc. of the corresponding function/equation. In some implementations, the parameters may correspond to different Archie parameters of an Archie's Equation, e.g., Equation 1 or Equation 2, as described above. Iterative mutations and crossovers in the symbolic regression may eventually produce an optimized target function (e.g., a mathematical expression) that defines a corresponding model of the reservoir formation.

In some embodiments, the ML model utilized by formation modeler 312 may be trained using a variety of different types of data associated with the reservoir formation, such as logging data 322 and core analysis data 324, e.g., from a variety of different data sources (e.g., different logging and/or core analysis tools) to estimate a property of the formation that is not included in the data. For instance, the ML model 330 may be trained to use data collected from various instruments, such as a core analysis tool and a downhole tool (e.g., a logging tool), to identify a candidate model that corresponds to the data from each of the instruments. To that end, the formation modeler 312 may combine measurement data corresponding to different physics to determine a model (e.g., as defined by a mathematical expression) that enables a petrophysics practitioner to evaluate, justify, and validate whether the model honors the various physics of the formation. In that regard, the crossover of input data coming from two different measurement physics, e.g., as performed by the formation modeler 312 using symbolic regression, may integrate different data sets, and the mutation process performed by the formation modeler 312 may produce an optimized model resulting from this integration. Further details regarding the use of symbolic regression for training an ML model, such as ML model 330, (also referred to herein as a "symbolic regression model") to determine an optimal formation model (e.g., as selected from a population of candidate models) and estimate formation properties using such a model will be described in further detail below with respect to FIGS. 4-7.

In some embodiments, the property of the formation may be represented by an Archie parameter, such a tortuosity coefficient, a cementation exponent, or a saturation exponent associated with the reservoir formation, as described above. Additionally or alternatively, the property may be a porosity, permeability, capillary pressure, bound fluid volume, shale volume, productivity index, relative permeability, effective permeability, hydrocarbon properties, formation salinity, and/or the like. Further, in some cases, the system may further manipulate or use an estimated property to determine a further property.

In some embodiments, the system 300 may output the estimated property of the reservoir formation. In some embodiments, the property of the reservoir formation may be provided as a numerical indication, a graphical indication, a textual indication, or a combination thereof. For instance, the property of the reservoir formation may output to and/or by the GUI 314, and/or the data visualizer 318. For instance, the property of the reservoir formation may be output to the GUI 314, which may be provided on a display (e.g., an electronic display). The display may be, for example and without limitation, a cathode ray tube (CRT) monitor, a liquid crystal display (LCD), or a touch-screen display, e.g., in the form of a capacitive touch-screen light emitting diode (LED) display. Further, the data visualizer 318 may be used to generate different data visualizations, such as bar graphs, pie graphs, histograms, plots, charts, numerical indications, textual indications, and/or the like based on the property of the reservoir formation. The data visualizer 318 may further perform any suitable data analysis on the property of the reservoir formation, such as interpolation, extrapolation, averaging, determining a standard deviation, summing or subtracting, multiplying or dividing, and/or the like. Moreover, the data visualizer 318 may be used to visualize a model of the reservoir formation based on the estimated property of the reservoir formation and/or the wellsite data 320 (e.g., logging data 322 and/or core analysis data 324). In some instance, the formation model may be visualized as a 2D or a 3D model within GUI 314.

In some embodiments, GUI 314 enables a user 340 to view and/or interact directly with the modeled reservoir formation or properties thereof. For example, the user 340 may use a user input device (e.g., a mouse, keyboard, microphone, touch-screen, a joy-stick, and/or the like) to interact with the modeled parameters of the reservoir formation via the GUI 314. In some embodiments, the GUI 314 may receive a user input via such a device to modify, accept, or reject the estimated property of the reservoir formation. Moreover, in some embodiments, such a user input may alter the training and/or output of the formation modeler 312, as described in greater detail below. The GUI 314 may additionally or alternatively receive a user input to generate the model, to generate a particular data visualization (e.g., via the data visualizer 318), to run a particular simulation with the model, to adjust a characteristic of the model and/or a data visualization, and/or the like.

While certain components of the system 300 are illustrated as being in communication with one another, embodiments are not limited thereto. To that end, any combination of the components (including memory 310, formation modeler 312, GUI 314, network interface 316, and data visualizer 318) illustrated in FIG. 3 may be communicatively coupled via an internal bus of system 300.

Figure 4:
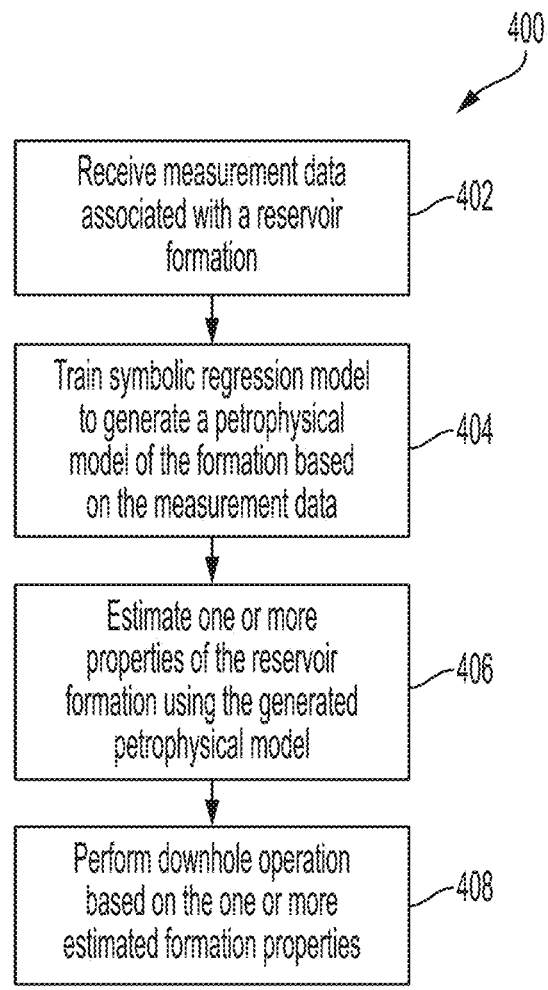
FIG. 4 is a flowchart of an illustrative process for developing a petrophysical interpretation model of a reservoir formation using machine learning and symbolic regression, in accordance with embodiments of the present disclosure.

FIG. 4 is a flowchart of an illustrative process 400 for developing a petrophysical interpretation model of a reservoir formation using machine learning and symbolic regression. As will be described in further detail below, the petrophysical model may be used to estimate properties of the formation and perform different stages of a downhole operation along a planned path of a wellbore drilled within the formation. For discussion purposes, process 400 will be described with reference to FIG. 1 and the system 300 of FIG. 3. However, process 400 is not intended to be limited thereto.

As shown in FIG. 4, process 400 begins in block 402, which includes receiving measurement data associated with the reservoir formation. In some embodiments, the measurement data may include measurements of formation parameters collected by different types of measurement devices for a planned path of a wellbore being drilled within the reservoir formation during a current stage of a downhole operation. The measurement data may include, for example, logging data (e.g., logging data 322 of FIG. 3, as described above) collected by one or more downhole tools, such as tools 1026 and 1028 of FIG. 1. Additionally, the data may include core analysis data (e.g., core analysis data 324 of FIG. 3, as described above) associated with a core sample as collected by a core analysis tool. The measurements collected by each measurement device may be characterized by the measurement physics associated with that device, which may vary from one type of measurement device to another. The measurement data may be representative of the collective responses of the formation's rock matrix, pore spaces, and fluids to the different measurement tool physics. Examples of such tool physics include, but are not limited to, nuclear, electromagnetic, magnetic resonance, acoustic, and optical wave physics. Accordingly, the measurement data may include, for example and without limitation, NMR data, resistivity data, induction data, acoustic, density data, photoelectric (PE) factor data, spontaneous potential (SP) data, natural gamma ray data, neutron data, and well log data. As will be described in further detail below, the symbolic regression model used in the disclosed petrophysical modeling techniques may combine multi-physics measurement data with genetic programming based artificial intelligence (AI) or machine learning to produce interpretation models and corresponding model equations over multiple iterations. The interpretation models may utilize formation responses (e.g., logging data and/or core analysis data) as inputs to capture variations of formation characteristics and make appropriate adjustments to the candidate models/equations produced during each iteration accordingly.

The measurement data received in block 402 may be used in block 404 of process 400 to train a symbolic regression model (e.g., a machine learning model using symbolic regression), such as ML model 330 of FIG. 3, as described above, to generate a petrophysical model of the formation. In one or more embodiments, the symbolic regression model may be trained to generate a target petrophysical model of the formation, as will be described in further detail below with respect to FIG. 5.

Figure 5:
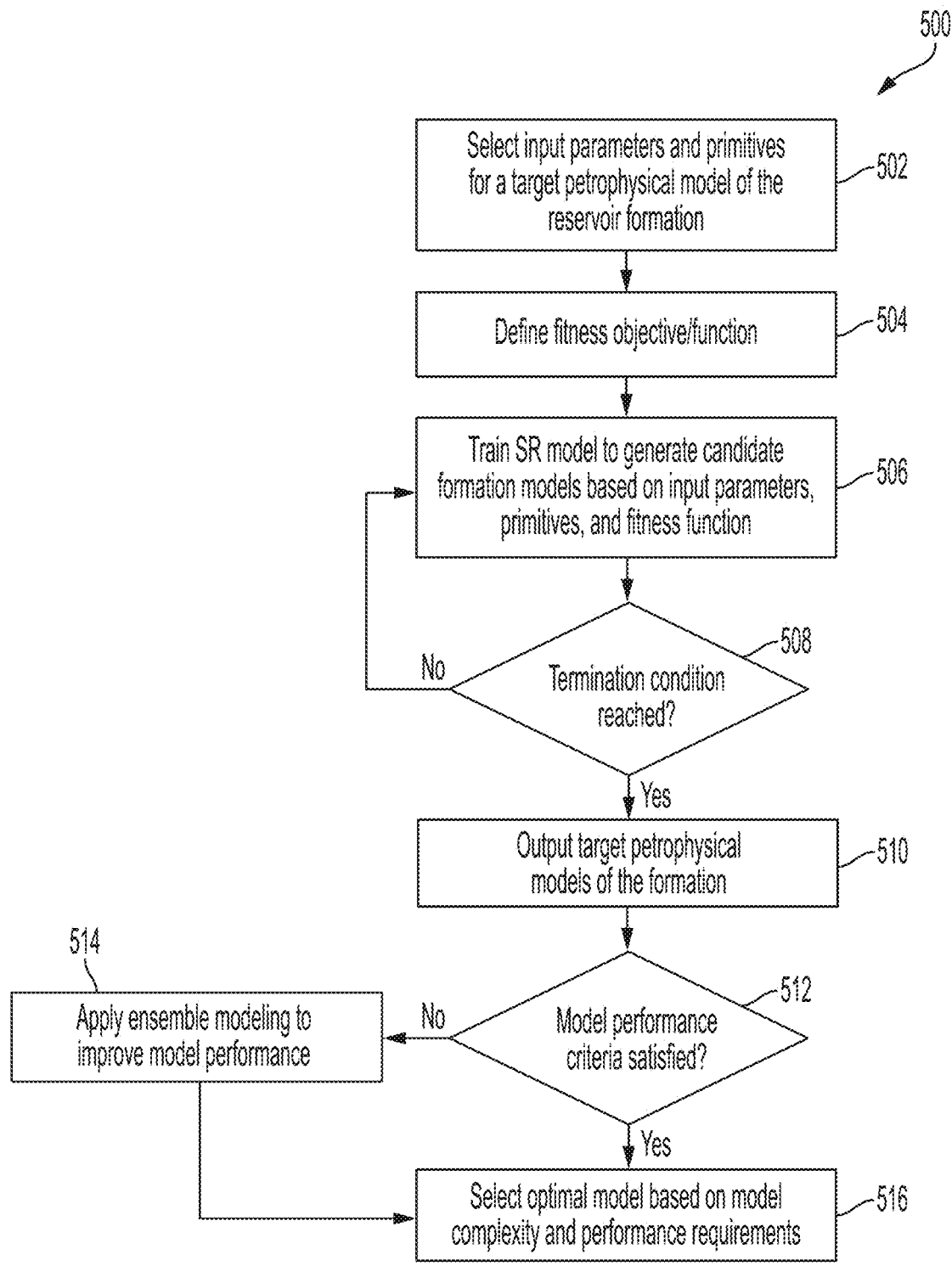
FIG. 5 is a flowchart of an illustrative process for training a symbolic regression model, in accordance with embodiments of the present disclosure.

FIG. 5 is a flowchart of an illustrative process 500 for training a symbolic regression (SR) model to generate a target petrophysical model of the reservoir formation, e.g., a petrophysical interpretation model representing a target parameter of the formation. For discussion purposes, process 500 will be described with reference to process 400 of FIG. 4, as described above, in addition to drilling system 100 of FIG. 1 and system 300 of FIG. 3, as described above. However, process 500 is not intended to be limited thereto.

As shown in FIG. 5, process 500 begins in block 502, which includes selecting input parameters and primitives for a target petrophysical model of the reservoir formation. As will be described in further detail below with respect to FIG. 6, the input parameters and primitives may be selected based on the measurement data received in block 402 of process 400, as described above.

Figure 6:
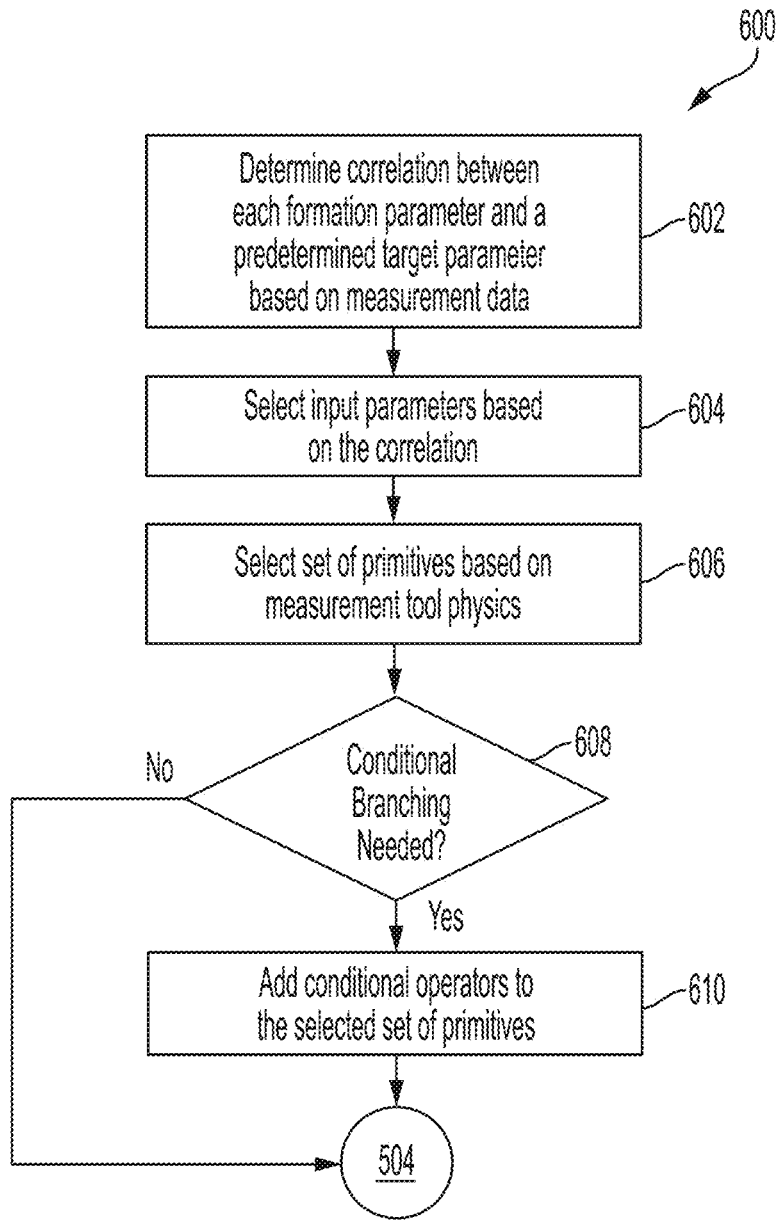
FIG. 6 is a flowchart of an illustrative process for selecting optimal input parameters and primitives to train the symbolic regression model of FIG. 5, in accordance with embodiments of the present disclosure.

FIG. 6 is a flowchart of an illustrative process 600 for selecting optimal input parameters and primitives to train the symbolic regression model of FIG. 5. As shown in FIG. 6, process 600 may begin in block 602, which includes determining a correlation between each of the formation parameters and a predetermined target parameter based on measurement data, e.g., as received in block 402 of process 400. The correlation is then used in block 604 to select input parameters for training the SR model to generate the target petrophysical model of the formation. As described above, the measurement data used for the correlation in block 602 may include wellsite data (e.g., logging data 322 of FIG. 3, as described above) collected by a downhole logging tool, e.g., LWD tool 1026 of FIG. 1. The measurement data may also include core analysis data, e.g., core analysis data 324 of FIG. 3, as described above. The predetermined target parameter may be any of various quantitative parameters of a reservoir formation that are directly related to the formation's hydrocarbon storage capacity, reserve quantification, and recoverability. In some cases, the target parameter may not be directly measurable from the formation, e.g., as a direct output of a downhole logging tool, but may be derived from the tool measurements using petrophysical interpretation equations, e.g., Archie's Equations, as described above. Examples of such a target parameter include, but are not limited to, formation resistivity factor (F), permeability, porosity, and saturation. In some implementations, the predetermined target parameter may correspond to a property of the formation to be estimated (e.g., at block 406 of process 400, as will be described in further detail below) using the petrophysical formation model output by the trained SR model (e.g., at block 514 of process 500, as will be described in further detail below). The formation parameters that are measured by the measurement devices as described above may be referred to as input or predictor parameters (or "input/predictor variables") that may affect values of the target formation parameter (or "target variable"). The terms "parameters" and "variables" are used interchangeably herein to refer broadly and inclusively to any of various static or dynamic attributes or features of a formation that may be quantified (e.g., modeled and/or measured) according to different conditions and criteria.

In some embodiments, the correlation in block 602 may be determined by calculating a correlation coefficient between each of the measured formation parameters and the predetermined target parameter for the reservoir formation. In some implementations, the calculated correlation coefficients may be used to generate a correlation heat map. A correlation heat map may be a graphical representation of a correlation matrix representing the correlation among different formation parameters (predictor variables) and the target parameter (target variable). The correlation may be representative of various input measurement responses of the formation, e.g., based on core and logging data. Understanding predictive relationship between the predictor variables and the target outcome is extremely important. If a strong positive or negative correlation exists between one or more measurement responses and the target variable, it can provide us the confidence that these measurement responses can be considered as input features for training the models.

Furthermore, the correlation heatmap can also provide correlation information among different measurement responses by determining multicollinearity. If the correlation between two predictor variables comes out to be greater than certain value, such as 0.7 or less than certain value, such as −0.7, one of these variables can be removed when training the model. In presence of predictor variables having multicollinearity, the coefficients of the predictor variables in the model can be unreliable. This further allows us to reduce the number of measurements required to predict a petrophysical outcome or to have a choice of including either one of the variables in the prediction equation. The implication of this is that if one logging data is not available, then the other measurement can be used in place of the missing measurement for the desired petrophysical parameter prediction.

In a correlation heat map, the correlation coefficients of all the predictor variables may be calculated and shown in a pairwise fashion. This allows the correlation heat map to indicate the relevancy of all the variables. The variables for which the correlation coefficient is relatively high may be selected for the petrophysical model to be derived from training the SR model, as will be described in further detail below. Variables having a relatively strong positive correlation (e.g., greater than 0.7) or strong negative correlation (e.g., less than −0.7) generally indicates that it has a relatively high degree of relevancy to the target variable.

Figure 9:
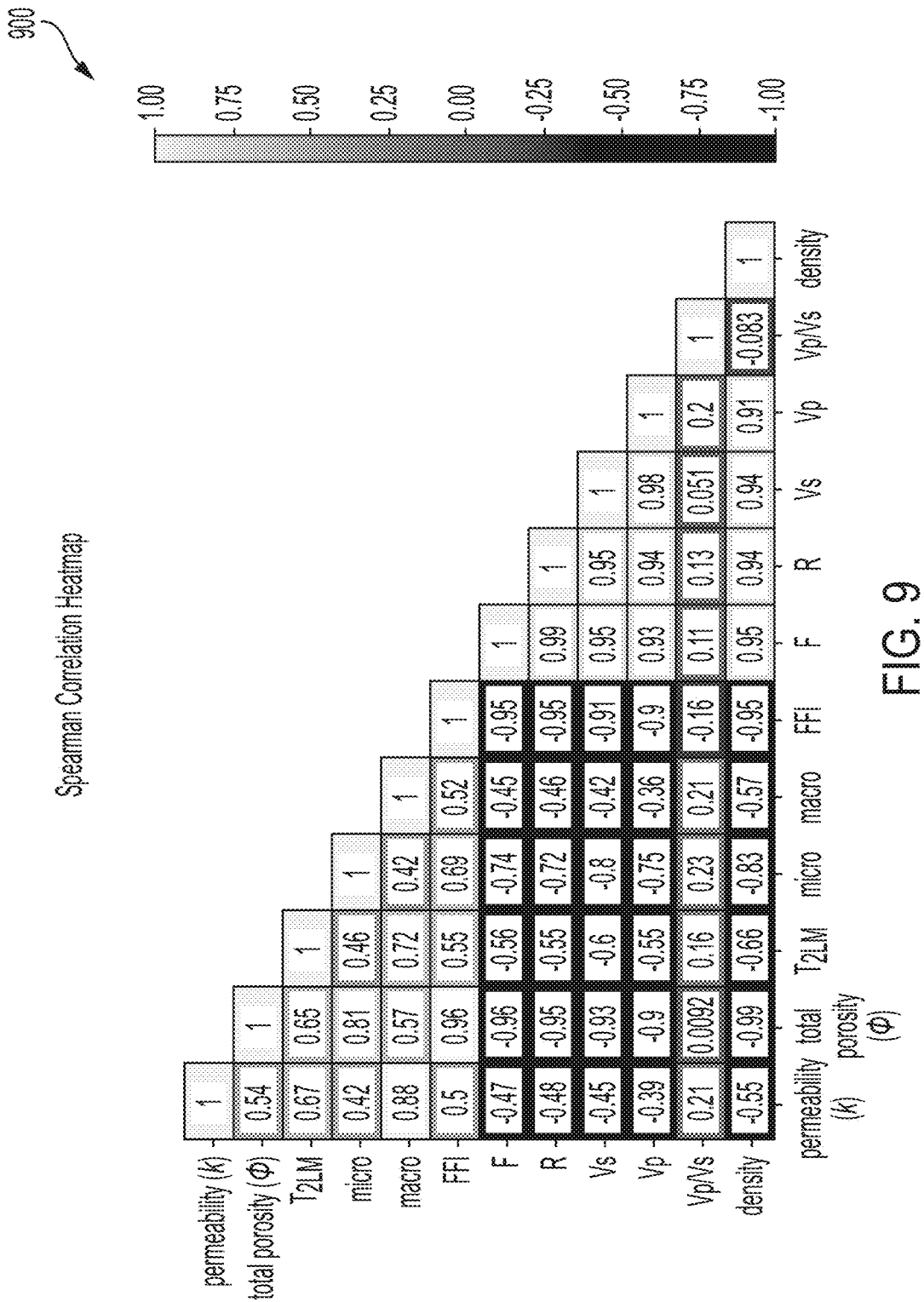
FIG. 9 is a correlation heat map for different formation parameters based on a Spearman correlation function.

FIG. 9 shows an example of a correlation heat map 900 generated based on a Spearman monotonic ranking correlation function. However, it should be appreciated that embodiments of the present disclosure are not intended to be limited thereto and that any of various correlation functions, e.g., a Pearson linear correlation function, may be used instead. In the example of FIG. 9, if formation resistivity factor (F) is considered the target parameter/variable, then total porosity ($\phi$), microporosity ($\phi_{micro}$ or "micro"), macroporosity ($\phi_{macro}$ or "macro"), free fluid index (FFI), R, density, Vs, and Vp are predictor variables that may be considered to have high correlation and relevancy with F. As for multicollinearity, since the correlation coefficient between Vs and Vp indicates they have high relevancy with each other, only one of these variables needs to be selected as an input parameter for training the SR model to produce a target petrophysical model.

Figure 10B:
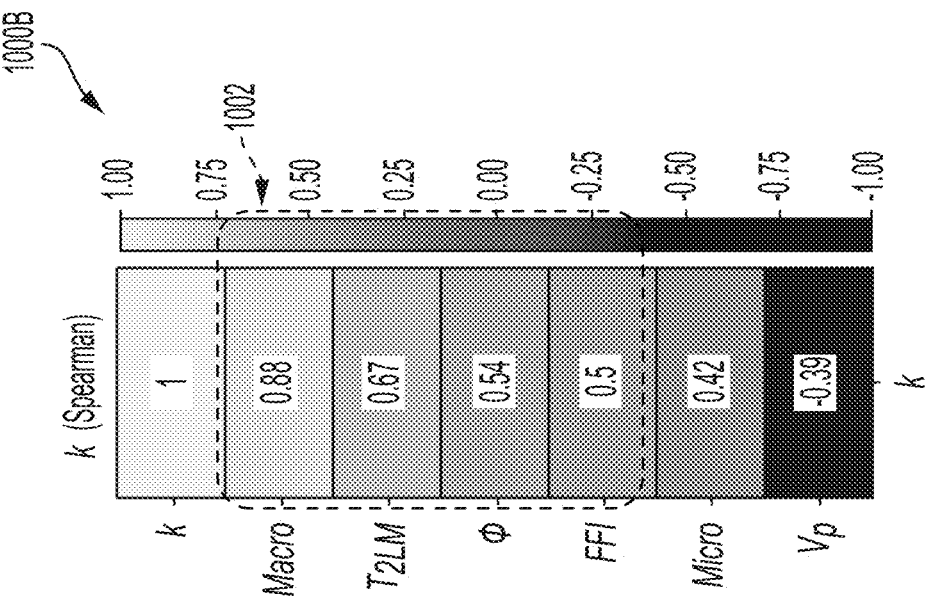
FIG. 10B is another correlation heat map with sorted correlation coefficients from FIG. 10A.
Figure 10A:
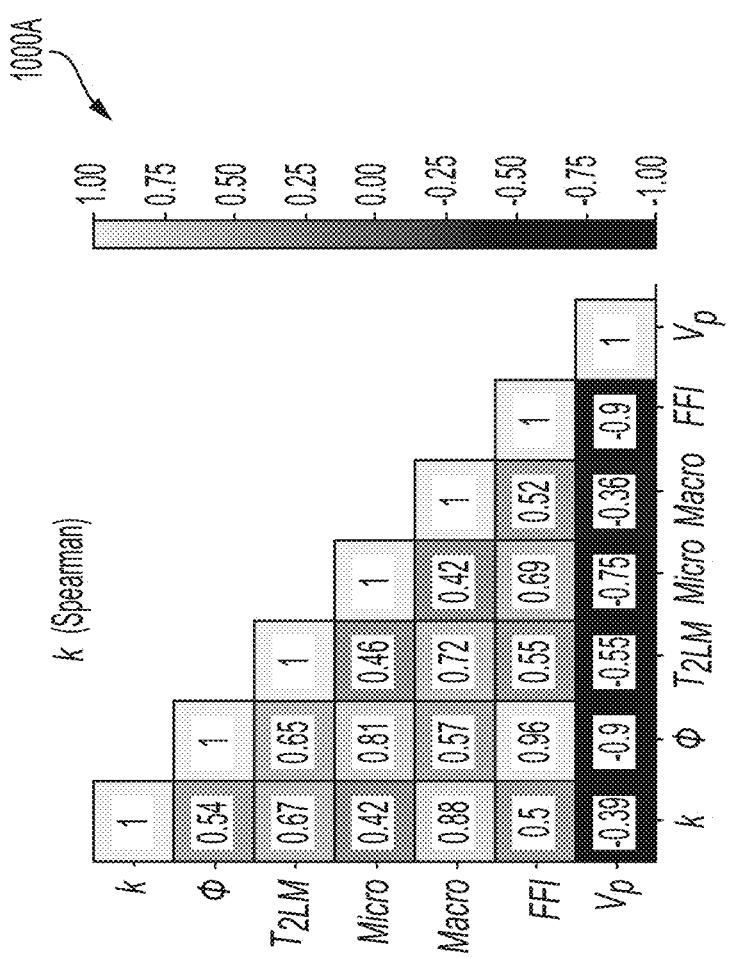
FIG. 10A is a correlation heat map for a target formation parameter selected from the formation parameters of FIG. 9.

FIGS. 10A and 10B show additional examples of correlation heat maps based on the Spearman correlation function. In FIG. 10A, a correlation heat map 1000A shows a matrix of correlation coefficients between different formation parameters (or predictor variables) and a target formation parameter/variable, which is permeability (k) in this example. FIG. 10B is a correlation heat map 1000B with the correlation coefficients of FIG. 10A sorted in descending order from top to bottom. In correlation heat map 1000B of FIG. 10B, a set of formation parameters 1002 may be selected as the predictor variables for determining the target formation parameter, i.e., permeability (k). As shown in FIG. 10B, the selected formation parameters/predictor variables 1002 in this example include macroporosity ("Macro"), the Log Mean of the NMR $T_2$ distribution ($T_{2LM}$), free fluid index (FFI), and total porosity ($\phi$).

Returning to FIG. 6, once the input parameters for the target petrophysical model are selected in block 604 based on the correlations determined in block 602, process 600 proceeds to block 606. Block 606 includes selecting a set of primitives based on measurement tool physics, e.g., the physics of the measurement tool(s) used to collect the measurement data corresponding to the selected input parameters (or predictor variables), as described above.

As used herein, the term "primitives" may include mathematical expressions and operators for different functions or equations that may be used to define candidate models of the formation. Such primitives may include, for example, certain exponents or constants associated with a function or equation that represents one or more of the input parameters (or predictor) variables selected for the formation. The selected primitives may be considered initial genotypes for the genetic programming-based SR training described herein, in which a machine learning model (e.g., ML model 330 of FIG. 3) is trained using symbolic regression with crossover and mutation processes that mimic genetic evolution, as will be described in further detail below with respect to block 506 of FIG. 5. In some embodiments, one or more preselected functions and associated operators may be used to narrow the "gene pool" based on measurement physics, where certain functions and operators that do not obey the measurement physics may be excluded while others that are known to correlate well with the target formation parameter may be added. For instance, triangular functions are largely irrelevant to many petrophysical interpretation equations therefore, they are better excluded to avoid the risk of fitting noise. It is also desirable to combine certain input variables in accordance to their correlation with the target variable. For instance, if $$\frac{\phi_{micro}}{\phi}$$

is known to correlate to permeability better than $\phi_{micro}$ and $\phi$ separately, it would make sense to define $$\frac{\phi_{micro}}{\phi}$$

as one of the preselected input variables, along with $\phi_{micro}$ and $\phi$. Doing so increases computational efficiency while making the target equation more physically interpretable.

When data from more than one measurement tool (e.g., data from downhole tool 1026 or 1028 and core analysis tool 117 of FIG. 1, as described above) is involved, the selected primitives set may include elements that define the relationship of these measurements. The primitives set may therefore represent measurement characteristics of the tools that affect the formation data acquired by each tool and thus, serve as a building block for the evolution of the function (e.g., model) output by the formation modeler 312 based on such data. The elements in the primitives set can be represented as a tree, a list, or another mathematically transparent form. In the illustrated embodiment, the tool measurement physics are used in the primitives set, which may limit an initial construction of function search space for the symbolic regression model.

In some embodiments, a first set of primitives may be selected based on the logging data or the type of downhole tool used to collect this data. The selection of the primitives set may further involve automatically determining, based on the core sample data or identification of the core analysis tool used to collect this data, a different, second primitives set. Primitives from one or more of the first and second sets may be applied to the symbolic regression model.

The primitives in the selected set(s) may also be used as constraints in crossover and mutation (e.g., at block 506, as will be described in further detail below). For instance, tool measurement physics can be used to define those features that are preferred to be retained instead of removed or replaced during crossover and/or mutation. In that regard, defining relationships or features that are relatively strong, such as NMR $T_2$ being proportional to pore size, permeability being inversely proportional to bulk volume irreducible, and/or the like to be retained may result in physics of the tool measurements being obeyed and a computational efficiency of the formation modeler 312 being improved over cases where these features are not retained.

Figure 7:
FIG. 7 is a table of an illustrative dataset for training a symbolic regression (SR) model, in accordance with embodiments of the present disclosure.

In some embodiments, the data and/or primitives set(s) used to train the symbolic regression model may depend on the data available and/or the property being predicted by the symbolic regression model and/or by the model output produced by the symbolic regression model, as described in greater detail with reference to FIGS. 7 and 8. FIG. 7 is a table 700, which provides an illustrative example of a dataset useful for training the symbolic regression model, e.g., for selecting the primitives in a set and defining relationships between the selected primitives.

In some embodiments, the symbolic regression model may be used to predict the cementation exponent m, the saturation exponent n, or another of Archie's parameters from logging data. The training data for the symbolic regression model may include core analysis data alone, logging data alone, or a mixed core analysis and logging data. In the case of training data including core analysis data alone, m, n, and the Archie model constant can be directly determined from appropriate resistivity or conductivity measurement of brine, core plugs fully saturated with brine, and core plugs saturated with different fraction of hydrocarbon, So, and the brine, $S_w=1-So$. The values may be determined according to Equations (1) and (2), for example and may be considered a benchmark or "ground truth" target in the training process.

Further, to develop a formation model, e.g., a petrophysical model, which is applicable to using logging measurements as inputs, additional core analysis data measurement inputs that are equivalent to logging measurements may be used. In consideration of which logging data may be more relevant to the cementation factor m and the tortuosity constant a, logging measurements that may respond to tortuous flow pathways and rock cement may be evaluated. As shown in FIG. 7, the main controlling factors of tortuosity are the pore size, capillary tube size, grain size, and capillary tube abundance, as well as pore shape and grain shape. The logging measurements that correlate to tortuosity include resistivity, porosity, $T_1$ and $T_2$ distributions, NMR restricted diffusion measurement, and seismic velocity parameters (Vp and Vs), among others. As further shown in FIG. 7, the main controlling factors of rock cementation include mineralogy/diagenesis, rock compression, volume and distribution of cementing minerals. The logging measurements that may correlate to these attributes include mineralogy logs, density, gamma ray, acoustic (Vp and Vs), and elasticity and compression modulus.

The dataset illustrated in FIG. 7 may be used at the start of the formation model development process using the symbolic regression model. In some embodiments, not all of such logging data is available, and so a subset of data may be used. In general, tortuosity is primarily a direct measurement of pore space and pore fluid, thus a measurement that is primarily sensitive to pore and pore fluid, such as NMR, may be preferred. Cementation is primarily a rock matrix measurement, therefore a type of logging measurements that is dominantly reflective of the matrix properties, such as acoustics or nucleus may be desired. Since the tortuosity and cementation are related, a combination of at least one primary pore response and one primary matrix response may be employed with the symbolic regression model. In that regard, the primary response, NMR: pore fluids, of the tortuosity and/or the measurements associated with the tortuosity may be combined with the primary response, acoustics/nucleus: rock matrix, of the cementation of rock and/or the measurements associated with the cementation of the rock for the symbolic regression model.

Figure 8:
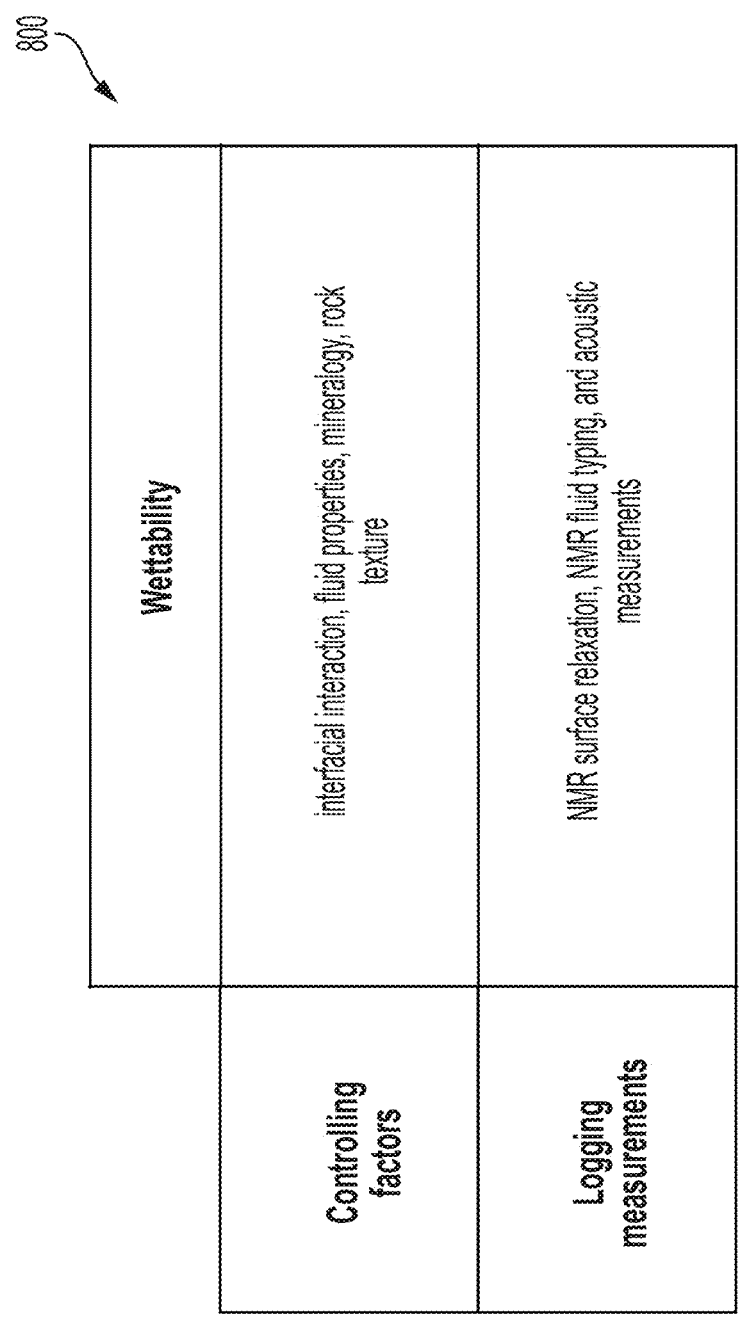
FIG. 8 is a table of controlling factors and logging measurements associated with a property of a reservoir formation, in accordance with embodiments of the present disclosure.

Turning now to FIG. 8, a table 800 illustrates controlling factors of wettability and related logging measurements are shown. The saturation exponent n involves multiphase fluids in pore space of a rock. The saturation exponent describes the dependency on the presence of non-conductive fluid, such as hydrocarbon fluid, in the pore space in different wettability characteristics of the rock. In a water-wet rock, a thin film of water on the surface of the pores that are occupied by oil, thus the brine phase forms a continuous phase thus has higher conductivity. In an oil-wet rock, water is the discontinuous phase in the form of droplets within the pore space, which lowers the conductivity. Wettability is largely controlled by mineralogy and mineral distributions in rocks, the viscosity and composition of the fluid saturating the rock, the texture of pore surface especially surface roughness, and interfacial interactions between pore fluid to grain. For the purpose of predicting n, it may not be required to explicitly determine wettability index from logs. For instance, in addition or the alternative to determining the wettability index, the types of logging data affected by wettability changes are identified and used to predict n.

The microscopic interfacial interaction may affect the NMR surface relaxivity, which may affect NMR relaxation time distribution response. Conductivity measurement is affected by wettability but may benefit from separation from other conductivity effects, such as clay content, type, and distribution, as well as the salinity of the formation fluid and in microlateral logging, the near wellbore invaded mud filtrate fluid salinity. Because n may eventually be used for interpreting EM logs for saturation determination, these logs may not explicitly be used as primary inputs for predicting the saturation exponent n.

The fluid properties, particularly oil viscosity and composition (such as SARA analysis) can be directly obtained from fluid sampling but usually they are only obtained at limited, discrete depths. On the other hand, NMR 1D, 2D, and/or 3D fluid typing can provide a large bulk of fluid properties.

Mineralogy and mineral distribution can be obtained by nucleus logging, including, but not limited to, density, gamma ray or spectral gamma ray, element spectroscopy, and other logging data. NMR and acoustic logs can be affected by rock texture.

Logging data sensitive to these four control factors (e.g., interfacial interaction, fluid properties, mineralogy, and texture) may preferably be selected for use by the symbolic regression model. In some embodiments, data sensitive to a subset of these control factors may alternatively be used to predict n using the symbolic regression model. Many of these logging measurements have equivalent laboratory core analysis measurements which, together with the laboratory RI (resistivity index) measurements and saturation measurements derived "ground-truth" n (e.g., based on core analysis), may be used to train the symbolic regression model to develop an appropriate formation model.

Returning to FIG. 6, after the set of primitives are selected in block 606, process 600 proceeds to block 608, which includes determining whether conditional branching is needed. Conditional branching is a model development technique that is applicable to scenarios where one or more input variables correlates to the target prediction parameter in distinct clusters. As a conventional empirical model development process usually requires an experienced petrophysicist to supply the conditional branching criteria needed to identify appropriate clusters, it may introduce human "preference" or bias into the process. Also, many conventional data driven modeling or prediction techniques often require starting with a clustering approach to first identify the clusters, and then determine individual models and corresponding equations for each cluster. Unlike the disclosed SR modeling techniques, as will be described in further detail below, such conventional model processes or techniques cannot be applied directly during a model training process to find an optimal branching condition.

While conditional branching can be an effective means to optimize prediction equation, the overuse of conditional branching could potentially cause overfit with the piecewise fitting mechanism, resulting in increased uncertainty of model application envelop to new data. Therefore, in some implementations, this capability may be enabled only when the performance of the unbranched prediction equation is not very satisfactory, e.g., fails to achieve model complexity and performance requirements.

In some embodiments, a conditional branching capability for training an ML model using genetic programming-based SR can be enabled or disabled by the inclusion or exclusion of branching operators, such as max, min, and if.

When the conditional branching is enabled, there may be a tendency for unnecessary branches to be added to the model equation. To prevent unnecessary conditional branching, model discrimination based on measurement and equation complexity (the fifth feature of the model development workflow described above) may be used to objectively determine whether branching is necessary.

If it is determined that branching is necessary in block 608, process 600 proceeds to block 610, in which conditional operators are added to the selected set of primitives. Otherwise, process 600 ends and the modeling workflow returns to block 504 of FIG. 5.

As shown in FIG. 5, block 504 of process 500 may include defining a fitness objective or function. The fitness objective (or fitness function) may be a function used to evaluate a product of the formation model being developed. The fitness objective may consist of a minimization process (e.g., mean-squares error minimization, root mean-squares error minimization, or other forms of error minimization). In some embodiments, the fitness objective may include additional components (e.g., a penalty function) to reduce formation model complexity and prevent overfitting the model to the data. In some embodiments, an overcomplicated formation model may fit to noise instead of the main reservoir formation and fluid features. Further, well logging data acquired in downhole operation often may have noise contamination significantly higher than laboratory core analysis measurement, and different logging measurements may have different degrees of noise contamination. Accordingly, the physics of tool measurements can be used to design the penalty function. Optionally, the fitness objective can include a regularization component to stabilize the predicted solution or target function output by the symbolic regression model and used to define a petrophysics model of the formation.

In block 506, the fitness objective/function defined in block 504 along with the input parameters and primitives selected in block 502 are used to train the SR model to generate candidate models of the formation. In some embodiments, the training in block 506 may be based on genetic programming. As will be described in further detail below, such genetic programming-based SR training may involve using crossover and mutation processes that mimic genetic evolution to generate multiple iterations of candidate formation models from an initial parent population of candidate models, based on the fitness objective/function. In some embodiments, the initial parent population of models may be based on one or more preselected functions and associated operators representing multi-physics measurement data acquired from one or more downhole tools, as described above. The function(s) and operators that are preselected may be based on, for example, the measurement physics of the underlying formation data. As described above, certain functions and operators that do not obey the measurement physics of the tool may be excluded while others that are known to correlate well with the target formation parameter may be added. In one or more embodiments, a term may be added or removed from a candidate function selected by the symbolic regression model based on the fitness objective (e.g., based on a fitness function score assigned to each term of the function) to improve the formation model being developed.

In some embodiments, the genetic programming-based SR training in block 506 may include performing evolutionary computation to find a formation model that best fits the training data, e.g., the selected primitives from block 502 in combination with wellsite data (e.g., logging data 322 and core analysis data 324 of FIG. 3). The main algorithm in the symbolic regression model may be an evolutionary algorithm or program that iteratively performs crossover and mutation operations to generate new genotypes (e.g., intermediate functions and corresponding candidate petrophysical models of the formation) at each iteration until a predetermined termination condition is satisfied or reached (at block 508). The genotypes may correspond to a child population of candidate models derived from the initial or preceding iteration's parent population, as described above. In some embodiments, a model selection process may be conducted to select a subset of candidate models from among the intermediate population of models generated at each iteration before crossover and mutation process is applied for the next iteration. The purpose of such a selection process may be to ensure the best formation models are selected as parents for each intermediate population that is generated while the crossover and mutation processes are used to explore the candidate model space. Crossover retains strong features, and mutation process explores model space with respect to the intermediate petrophysical model formula until a predefined termination condition is reached (e.g., at block 508). In some embodiments, constraints may be imposed during the crossover and mutation process such that a new intermediate model (e.g., a petrophysical model equation) after crossover and mutation has the same units on either side of the equation.

In block 508, the process 500 may involve determining whether a termination condition has been reached. The termination condition may be any predefined condition. The predefined termination condition may include, for example, a predefined fitness score (e.g., associated with the fitness objective). Additionally or alternatively, the termination condition may be a threshold number of generations (or iterations of block 506) that elapse without further or enough improvement (e.g., based on the fitness objective) of the petrophysical model generated by the symbolic regression model. Exploring model space during the crossover and mutation process can become excessively tedious depending on the complexity of the model. Thus, in order to improve computational efficiency, the fitness function (or fitness objective) may be dynamically modified to add a penalty for model complexity, as described above. Further, as described above, by retaining strong features in the crossover process, a more efficient process (e.g., improved computational efficiency) for building the targeted interpretation model may be provided, and the targeted model may better obey physics.

If it is determined at block 508 that the termination condition has not been reached, process 500 may return to block 506 to repeat the training over one or more additional iterations until the termination condition has been reached in block 508. If, however, the termination condition at block 508 has been reached, process 500 may proceed to block 510, in which a set of target petrophysical models of the formation may be produced as an output of the SR model training in blocks 506 and 508, as described above. Process 500 may then proceed to block 512, which includes determining whether the performance of each model output in block 510 satisfies predetermined model performance criteria. Such performance criteria may include, for example, a minimum level of performance that each model must satisfy for a particular implementation. In some embodiments, the model performance criteria may include a predetermined error tolerance or maximum amount of acceptable variance between each model's target output (e.g., estimated values of a target formation variable or parameter) and its inputs (e.g., actual or measured values of the target output or actual/measured values of input variables used to derive the target output). Such a model performance criterion may be expressed in terms of, for example, R-squared ($R^2$), where models with higher values of $R^2$ have higher performance. It should be appreciated that any appropriate measure of model performance may be used as desired for a particular implementation.

If it is determined at block 512 that the model performance criteria have not been satisfied, process 500 may proceed to block 514, which includes applying ensemble modeling to improve model performance, as will be described in further detail below. Otherwise, process 500 proceeds to block 516, in which an optimal model of the target formation is selected from the set of petrophysical models produced in block 510. In some embodiments, the optimal model may be selected based on various factors, including, but not limited to, mathematical complexity, measurement complexity, physics complexity, and model performance. For example, a score for each of these factors may be calculated for each model output in block 510, where relatively higher scores may be assigned to those models with relatively higher performance and lower complexity, and the model with the highest score overall may be selected in block 516 as the optimal target formation model.

Due to limitations in the amount of training data that may be available for developing an appropriate petrophysical model of the formation using SR along with the random nature of the genetic programming employed by SR, multiple target candidate models may be produced. However, each model may be only an optimized solution (or local minimum) in a sub-domain of the SR model input domain. For example, the SR model input domain may consist of three input variables (e.g., $\phi$, $\phi_{macro}$, $T_{2LM}$) whereas the candidate petrophysical models produced by the SR model during the training process may consist of only two of these three input variables, as expressed by Equations 3, 4, and 5 as follows:

$$k=0.68\phi^{1.16}T_{2LM}^{1.09} \quad (3)$$

$$k=1012\phi \cdot \phi_{macro}^{0.56} \quad (4)$$

$$k=0.0373\phi_{macro}^{0.55}T_{2LM}^{1.65} \quad (5)$$

Figure 11A:
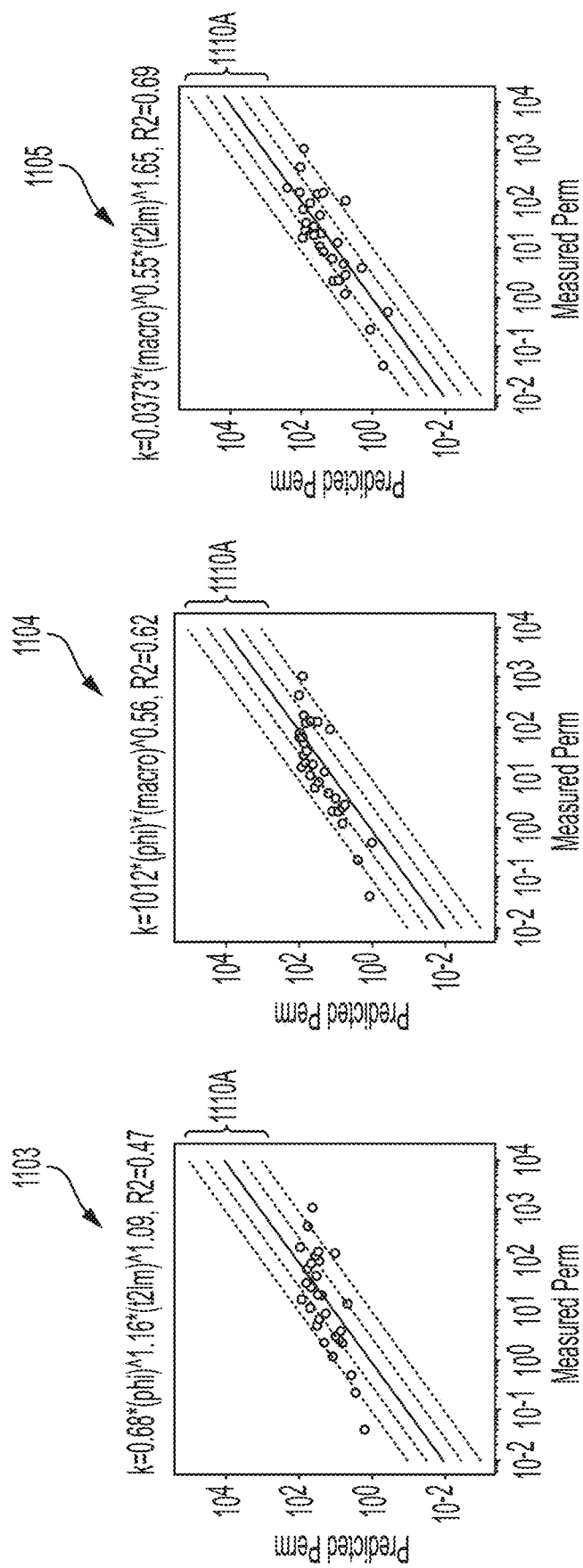
FIG. 11A is a diagram of three different plot graphs illustrating a performance comparison between three corresponding target petrophysical models for estimating formation permeability.

FIG. 11A is a series of plot graphs 1103, 1104, and 1105 showing the relative performance of three target petrophysical models corresponding to Equations 3-5 above, respectively. It is assumed for purposes of this example that the dots in each plot graph are data points representing predicted values of permeability while the solid line represents measured permeability values within a corresponding error tolerance window 1110A (as shown by the dotted lines). Accordingly, dots that intersect the lines in each graph represent matching data points (i.e., points at which the predicted values match the measured values). As shown by the number of matching data points in each graph, all three models perform reasonably well over certain ranges of permeability. However, as each graph also includes several data points that are located near the edges of the error tolerance window 1110A or that fall outside the window and do not intersect any lines, none of the models perform well overall. Plot graphs 1103 and 1104 show that the models corresponding to Equations 3 and 4 perform poorly at the lower end of the permeability range, while plot graph 1105 shows that the model for Equation 5 performs slightly better than the models for Equations 3 and 4. These results indicate that these three models are the local optimization solutions in the sub-domains.

To avoid or mitigate the problem of local optimization and improve model performance, ensemble modeling may be used to combine the predictions of several machine learning models. In some embodiments, the ensemble modeling may be performed by averaging the results of these machine learning models. Hence, the averaged ensemble model of Equations 3, 4, and 5 may be expressed by Equation 6:

$$k = \frac{0.68\phi^{1.16}T_{2LM}^{1.09} + 1012\phi \cdot \phi_{macro}^{0.56} + 0.0373\phi_{macro}^{0.55}T_{2LM}^{1.65}}{3} \quad (6)$$

FIG. 11B is a plot graph 1106 that shows the performance of the average ensemble model according to Equation 6 above. However, based on the number of data points that lie outside or near the edges of an error tolerance window 1110B, the model performance relative to that of FIG. 11A has not improved significantly. Furthermore, the averaged ensemble modeling technique fails to account for the underlying relationship between the target variable, permeability (k), and input/predictor variables ($\phi$, $\phi_{macro}$, $T_{2LM}$).

Thus, instead of the conventional ensemble modeling technique, a "conceptual ensemble" technique may be used to combine different candidate models and thereby create an improved target model (and corresponding equation). The conceptual ensemble starts with examining each of the SR models (e.g., corresponding to Equations 3, 4, and 5, as described above) to infer the underlying relationship of the target permeability variable (k) and the input variables ($\phi$, $\phi_{macro}$, $T_{2LM}$). From Equation 4, it may be inferred that the target variable k and inputs variables ($\phi$, $T_{2LM}$) are in a linear relationship on a logarithmic (log) scale. From Equation 5, it may be inferred that the target variable k and input variables ($\phi$, $\phi_{macro}$) are in a linear relationship on the log scale. From Equation 6, it may be inferred that the target variable k and input variables ($\phi_{macro}$, $T_{2LM}$) are in a linear relationship on the log scale. The three inferences may be combined conceptually to conclude that the target variable k and inputs variable ($\phi$, $\phi_{macro}$, $T_{2LM}$) are in a linear relationship on a logarithmic scale, as expressed by Equation 7:

$$\ln k = a + b1 \ln \phi + b2 \ln \phi_{macro} + b3 \ln T_{2LM} \quad (7),$$

where a, b1, b2, b3 are coefficients to be determined using linear regression.

FIG. 11C is a plot graph 1107 that shows the conceptual ensemble model and its performance with an error tolerance window 1110C. The performance improvement may be expressed in terms of R-squared ($R^2$) or any other measure of variance between the input and target variables as desired for a particular implementation. The most noticeable improvement shown by plot graph 1107 relative to the graphs corresponding to Equations 3, 4, and 5 in FIG. 11A is at the lower end of the range of permeability.

As an alternative to the logarithmic ensemble approach described above, a stacking ensemble approach may be used instead. In general, the raw measurements for input variables, e.g., $\phi$, $\phi_{macro}$, $T_{2LM}$, may be applied as inputs to an SR model. In the stacking approach, the input variables are engineered from the candidate models, e.g., as expressed by Equations 3, 4, and 5 described above. In Equations 3, 4, and 5, the terms $\phi^{1.16} T_{2LM}^{1.09}$, $\phi \cdot \phi_{macro}^{0.56}$, and $\phi_{macro}^{0.55} T_{2LM}^{1.65}$ may represent the corresponding engineered variables.

Returning now to FIG. 5, block 514 of process 500 may involve outputting a target formation model (e.g., a petrophysical model) that corresponds to (or best fits) the tool data. The target model may be defined by a target function in the form of a mathematical expression, for example. As such, the output model may be evaluated and/or validated against properties of the formation and/or the tools.

Once the termination condition is reached (e.g., at block 510), at least one mathematical expression may be obtained by the symbolic regression model. Accordingly, at block 514, the process 500 may involve outputting the mathematical expression (e.g., a petrophysical model) that was generated by the symbolic regression model. In some cases, more than one model is generated by the regression model that meets the termination condition. To that end, the symbolic regression model may output a single model or multiple models. For instance, based on a ranking of the models meeting the termination condition, the symbolic regression model may output (e.g., select) a model with a best-fit. In cases where multiple models are output (e.g., at block 514), the expressions may be evaluated and/or examined to select a particular model, which may not be possible with conventional data-driven modeling approaches, as described above. That is, for example, a user may provide a user input to select a candidate model from among one or more models. In some embodiments, a particular model that does not overfit or violate the underlying measurement physics may be selected for estimating properties of the reservoir. Moreover, since the symbolic regression model may generate mathematical expressions over iterative evolutions (e.g., blocks 506 and 508), candidate models may be examined in an intermediate form (e.g., before the termination condition in block 510 is satisfied) within the whole population of models, which may be helpful to determine the reasonableness of a candidate model in terms of obeying measurement physics. While evaluation of the intermediate models is not necessarily required, it may provide a means of ruling out models with an overfitting issue, particularly due to noise contamination or systematic measurement errors.

If the candidate model output at block 514 is satisfactory, the model development process 500 is stopped. A user may accept the candidate model as satisfactory by providing a user input via the GUI 314, for example. To that end, the candidate model may be selected from among a group of candidate models. Additionally or alternatively, the candidate model may be identified as satisfactory based on the model obeying certain physics, correlating to data (e.g., test or validation data) within a certain threshold, and/or the like. A candidate model may be less than satisfactory for a variety of reasons. For instance, for multiphysics measurements, correlation of the candidate models with one or more of the measurements may be weak (e.g., below the threshold). In some embodiments, the candidate model may show an opposite or unreasonable dependency between terms and/or parameters. Further, in some embodiments, the candidate model may be too sensitive to a variable change and may thus be too sensitive to measurement uncertainty.

The correlation of the candidate models with one or more of the measurements being weak may indicate that the weakly correlated measurements should be removed from the model to simplify the model. As an illustrative example, in logging interpretation, one less well logging tool may be used to obtain the same petrophysical information. This simplification may not be readily apparent using other blackbox machine learning approaches that do not provide a model. In this way, the symbolic regression model advantageously may provide understanding and adaptability of the output model, which is not available via other modeling approaches.

The correlation of the candidate models with one or more of the measurements being weak may additionally or alternatively indicate that the training dataset is not large enough. That is, for example, the available training data may only represent a narrow envelope of formation characteristics, which may not adequately correspond to other formation characteristics. In such cases, adding more and different types of formations for retraining the symbolic regression model may increase the application envelope of the output model and the resulting correlation of the model.

This model discrimination procedure not only provides convenience for users to make decisions, but also helps petrophysicists decide which logging tool should be employed for obtaining this petrophysical attribute, which potentially improves the efficiency and economics of logging run selection.

The candidate model may show an opposite or unreasonable dependency if the initial primitives set is restrictive or if the training data quality is lacking. A corrective action for a restrictive primitives set may be to increase the search space of the symbolic regression model, and a corrective action for issues with training data quality may be to leave different portions of the training data out to determine which or if any of the portions are unsuitable for training the symbolic regression model.

Over-sensitivity often occurs for a part of data space instead of over the entire data space. To that end, the candidate model may be too sensitive to a variable change due to this uneven distribution of over-sensitivity. As an illustrative example, if one petrophysical parameter is found to be inversely proportional to porosity, then the model could be very sensitive to extremely low-porosity formation. In this case, the application envelope may be improved if the near-zero porosity is excluded. Another example is a petrophysical parameter that shows a power-law dependent to a measurement quantity. In this case, the model may become overly sensitive as exponent increases. Continuing with this example, setting an upper limit of the exponent to a physically reasonable value may limit the over-sensitivity of the model. In some embodiments, changing a functional form may reduce the oversensitivity of the model significantly. Accordingly, in some embodiments, a candidate model that avoids oversensitivity may be provided by re-defining the primitives set and retraining the data. For instance, the 1/porosity function may be removed from the primitives set and may be replaced with 1/(porosity+ε), where ε is a small constant that may not make much difference when porosity is large but may limit the value to 1/ε for zero porosity formation. Re-defining or changing the primitives set in cases where the model shows weak correlation or shows unreasonable dependencies may also be useful to attempt to generate an improved model or to determine differences between models generated based on different primitives sets.

The above examples of less than satisfactory candidate models and courses of action to correct the candidate model are intended to be exemplary and not limiting. In that regard, a candidate model may be optimized with the symbolic regression model using any suitable approach.

Returning now to FIG. 4, at block 406, the process 400 may involve estimating at least one property of the reservoir formation based on the model associated with the data. In particular, the property may be determined based on the model produced by the symbolic regression model (e.g., the mathematical expression output at block 514) using data from one or more tools. In some embodiments, the data received at block 402 may lack the property of the reservoir formation. That is, for example, the property may not be determined directly from the data in some embodiments. Examples of formation properties that may be estimated using the model include, but are not limited to, a porosity, permeability, capillary pressure, bound fluid volume, shale volume, saturation, productivity index, relative permeability, effective permeability, hydrocarbon properties, formation salinity. In some cases, the property may be an Archie's parameter, such as tortuosity factor, cementation exponent, or a saturation exponent. The property may be a saturation of reservoir rock associated with the subsurface reservoir formation. Further, the property may be an electrical efficiency parameter of reservoir rock associated with the subsurface reservoir formation, as described in greater detail below.

As described above, the symbolic regression model may output a formation model (e.g., a target petrophysical model expressed as a mathematical equation or equations). This model may be used to determine a property of a reservoir directly in some embodiments. For instance, using the model and data (e.g., logging data and/or core analysis data), a property of the reservoir, such as those listed above, may be determined. As an illustrative example, saturation may be directly determined using the model and the data. In some embodiments, a further derivation may be utilized to determine the property. Continuing with the example of saturation, the model may be used to determine the cementation constant, tortuosity constant, or saturation constant (e.g., Archie's parameters), which may then be used to determine the saturation. To that end, the value of predicting Archie's parameters is that they may provide an indicator of how far rock characteristics depart from ideal "Archie rock," in addition to their ability to be employed in a determination of saturation. However, for saturation determination, it is not necessary to use the Archie Equations as a bridge between logging measurements and saturation determination. The same set of logging data, plus electromagnetic logs (resistivity or induction), can serve the purpose using the techniques described herein.

Further, modeling has been described herein with respect to Equations 1 and 2, as described above, and/or parameters contained therein, the techniques described herein may additionally or alternatively be applied to other equations. To that end, use of Archie's equations (e.g., Equations 1 and 2) is one method to interpret conductivity data for wetting phase fluid saturation estimation in rocks, but this is not the only way of obtaining saturation from conductivity. Further, the Equations 1 and 2 may have limited accuracy even with calibrated C, m, and n for formation rocks that are significantly non-Archie type, such as shaly sands, because the conductivity of shale cannot be very well compensated by adjusting m, n, and a. Moreover, mathematically, high m and n values can make the equations overly sensitive to measurement uncertainties, as m and n are exponents (e.g., are associated with power law). For instance, for certain formations, especially for some carbonate formations, the value of the cementation exponent can be as high as 5. For strongly oil-wet formation, the value of the saturation exponent can be as high as 8. In such cases, it may be desirable to use different parameters to describe these situations.

Another approach for modeling reservoir formation properties is an electric efficiency model, as shown in Equations 8 and 9 below.

$$\frac{\sigma_t}{\sigma_w} = (Sw \cdot \phi)(e_t E_0) \qquad (8)$$

$$\frac{\sigma_0}{\sigma_w} = (\phi E_0) + c_0 \qquad (9)$$

In Equations 8 and 9, the term $E_0$ represents a brine geometric distribution factor, the term $e_t$ represents an HC emplacement modification of the brine geometric factor, the term $c_0$ represents a departure from Archie's rocks (residual conductivity at zero porosity), and the remaining terms correspond to their equivalents described in Equations 1 and 2. With the electric efficiency model, the conductivity ratio can be expressed as the product of volumetric fraction of conductive rock ($S_w \cdot \phi$), and some quantities related to electrical efficiency parameters may be expressed as ($e_t E_0$), where the efficiency is defined as the conductivity ratio between the standard tube model and the actual rock. In the electrical efficiency equations (e.g., Equations 8 and 9), the conductivity of shale can be conveniently described as one additional term $c_0$ representing normalized conductivity in a zero-porosity rock. The term $c_0$ thus represents conductivity from a rock matrix rather than fluid. Thus, the conductivity ratio of a brine saturated rock can be considered as the summation of one term representing contribution from fluid ($\phi E_0$) and one term representing contribution from matrix, $c_0$. Further, the term $E_0$ is only related to single brine phase saturated rock, and the term $e_t$ may only affect multiphase saturated rock. These two fluid geometric factors are related to the tortuosity of the rocks, and $e_t$ is further affected by wettability. Thus, the training data described in FIGS. 6 and 7 may also be suitable as the training data for the electrical efficiency model prediction using the symbolic regression model. That is, for example, the techniques described herein may be used to determine any of the parameters included in Equations 8 and 9.

Equations 1 and 2 include two exponent parameters (e.g., m and n), while Equations 8 and 9 include two multiplier parameters (e.g., the electrical efficiency parameters). Accordingly, the sensitivity (and over sensitivity) of Equations 1 and 2 is different than that of Equations 8 and 9 in the formation space. Since the electric efficiency model and Archie's model have different sensitive domains, and they may handle non-Archie rock types (e.g., shaly sands) differently, these two models may be effectively combined together and optimized using the symbolic regression model (e.g., using the techniques described herein). To that end, in some embodiments, the Archie model and the electrical efficiency model (e.g., Equations 1, 2, 8, and 9) may be used as the primitives set at block 502, and the symbolic regression model may be applied upon the primitives set to obtain the target models and corresponding equations (e.g., output at block 510). In this regard, crossover and mutation of these models may occur at block 506, and the resulting output may then be optimized (e.g., by applying ensemble modeling at block 514) and the optimal or final target model may be output at block 516. The final solution may be more similar to the form of the Archie model, the form of the electric efficiency model, a function combined from weighting both models with a significant weight, or an equation form completely different from the two models.

In some embodiments, the same input data may be used to predict m, n, $E_0$ and $e_r$ simultaneously. In this way, the petrophysical model output by the symbolic regression model may confirm both the Archie model and the electrical efficiency model. In some embodiments, a weighting scheme may be added to m, n, $E_0$ and/or $e_r$ depending on which one model is more accurate at for specific characteristics of a formation.

Further, in some embodiments, the formation model output by the symbolic regression model may be suitable to determine one or more properties of the reservoir formation over a continuous set of values. In this regard, the model may be used to determine a property of a heterogeneous subsurface reservoir formation that varies over different portions of the formation. For instance, the values of the formation property may be determined using continuous log data. Moreover, boundaries of the different portions, which may correspond to different facies, may be identified based on variation of the property values over the different portions of the formation. In this way, any number of facies and/or thresholds between property values defining different facies may be employed to characterize a formation.

At block 408, the process 400 may involve performing a downhole operation, based on the property of the formation estimated in block 406. Examples of such a downhole operation include, but are not limited to, a drilling operation to drill a wellbore or portions thereof along a planned path through the formation, a completion operation along one or more sections of such a wellbore path, and a stimulation operation involving fluid injection to stimulate hydrocarbon production from the formation surrounding one or more sections of a wellbore drilled along its planned path. In some implementations, the downhole operation may be a drilling operation in which the estimated formation property may be used to adjust the planned path of the wellbore being drilled. For example, the planned path may be adjusted by adjusting one or more operating parameters of a drill string (e.g., drill string 106 of FIG. 1, as described above) disposed within a wellbore being drilled along its planned path through the formation. The parameters may be adjusted, for example, by transmitting control signals representing the appropriate adjustments from a surface computing device (e.g., computer 1040 in FIG. 1) to a downhole controller coupled to a bottom hole assembly of the drill string. The signals received by the downhole controller may then be used to adjust the trajectory of the drill string and the path of the wellbore as it is drilled through the formation. It should be appreciated that any of various communication techniques, e.g., telemetry, may be used to transmit the control signals downhole and that the drill string may include any of various components (e.g., telemetry device 1030 of FIG. 1) for enabling the functionality described herein.

In one or more embodiments, process 400 may also include outputting the estimated property of the model for a user (e.g., user 340 of FIG. 3) at a computing device of the user. The property may be output to a display, such as electronic display coupled to the user's device. For instance, the property of the model may be provided at the GUI 314 of FIG. 3, as described above. The property of the model may additionally or alternatively be output to the data visualizer 318, which may perform additional analysis, as described herein. The process 400 may further involve outputting boundaries of different portions of the formation or the different values of a property of the formation over these different portions. Further, in some embodiments, the property of the model, boundaries, or different values of the property may be output to a data storage device.

In some cases, the reservoir formation may be too complex to be described by only one target formation model with a single mathematical form. The traditional approach is to classify the reservoir rocks into various types (facies) based on certain petrophysical and geological properties. The examples of facies can be lithofacies, electric facies, or other parameters, such as pore type, which may serve as a type of facies. Then, a petrophysical interpretation model (mathematical equation) is developed for the respective facies types. Often, the facies classification is carried out by domain experts, which is too subjective, error-prone and time consuming. Alternatively, data analytic methods, mainly cluster methods, can been used for facies classification. However, cluster methods use similarity or distance measure between training samples in the input parameter space. For example, cluster methods are applied to the input variable space ($\phi$, $\phi_{macro}$, $T_{2,LM}$) without any consideration of the target variable k. Hence, the classification derived from the cluster methods may not reflect the underline relationship between the target variable and input variables.

In some embodiments, conditional operators, such as min,max,if, may be incorporated into the above-described genetic programming process. The final optimized mathematical equation may contain these conditional operators. If the mathematical equation may contain these conditional operators, the mathematical equation can be branched into several simpler mathematical equations without containing these conditional operators. As a result, the input variable space is automatically branched, and each branch corresponds to a simpler equation. Equation 10 is an example of an equation with conditional operators that may be applied in the genetic programming process:

$$k = 1394\phi^{2.26} e^{0.95 max\left[-2.19, 5.35 + ln\phi + 3.98 ln\left(\frac{\phi_{macro}}{\phi}\right)\right]} \quad (10)$$

The max conditional operator in Equation 10 divides the input variables into two branches represented by Equation 11 and Equation 12:

$$5.35 + ln\phi + 3.98 ln\frac{\phi_{macro}}{\phi} > -2.19 \quad (11)$$

-continued $$5.35 + \ln\phi + 3.98\ln\frac{\phi_{macro}}{\phi} < -2.19 \quad (12)$$

The candidate models corresponding to Equations 11 and 12 may be expressed by Equations 13 and 14 as follows:

$$k = 174\phi^{2.26} \text{ if } 5.35 + \ln\phi + 3.98\ln\frac{\phi_{macro}}{\phi} < -2.19 \quad (13)$$

$$k = e^{12.32}\frac{\phi_{macro}^{3.78}}{\phi^{0.54}} \text{ if } 5.35 + \ln\phi + 3.98\ln\frac{\phi_{macro}}{\phi} > -2.19 \quad (14)$$

Figure 12:
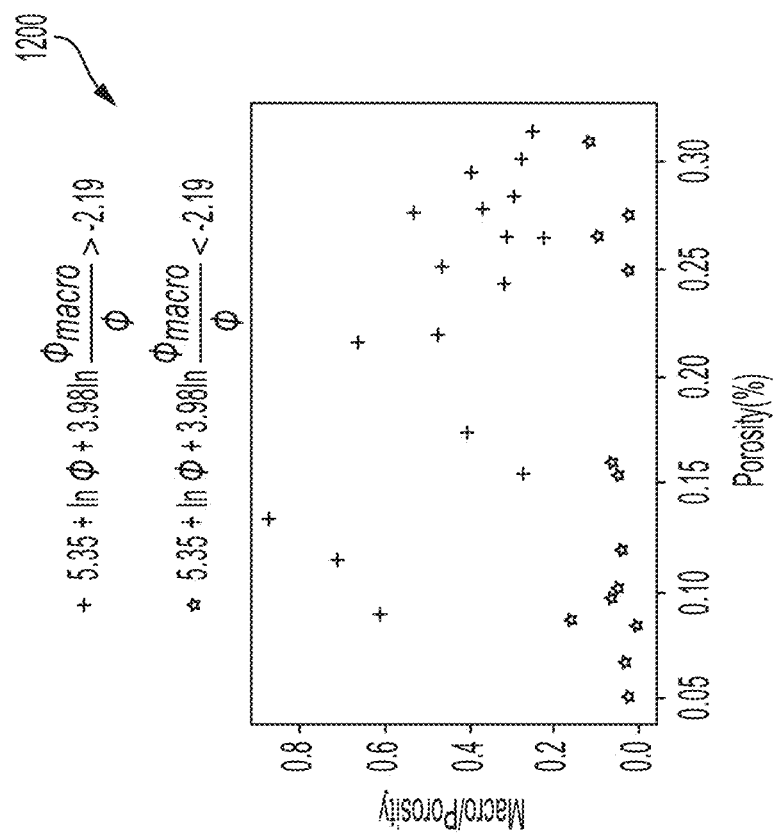
FIG. 12 is a plot graph illustrating two conditional branches for a selected input parameter of the ensemble model of FIG. 11C.
Figure 13:
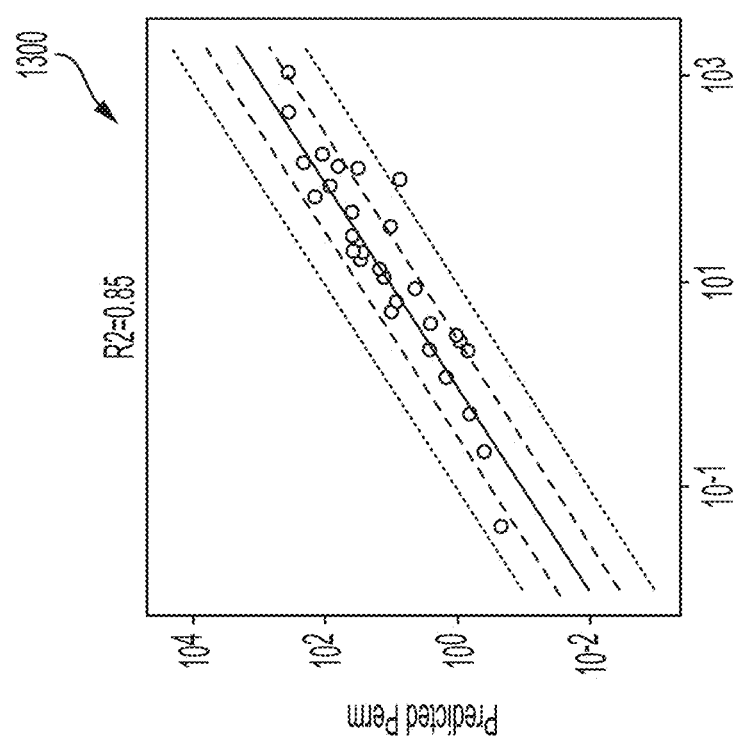
FIG. 13 is a plot graph showing the performance of a target petrophysical model developed using genetic programming-based SR with conditional branching.

FIG. 12 is a plot graph 1200 illustrating the two conditional branches represented by Equations 13 and 14 above. There is a clear separation and well defined between the two branches. FIG. 13 is a plot graph 1300 showing the performance of the SR model represented by Equation 10 above, which shows a significant improvement compared to the ensemble model of FIG. 11C. Furthermore, the performances for lower permeability and high permeability are all improved.

Alternative approach to using conditional branching discussed above is to identify facies first. The facies can be lithofacies, electric facies, or other petrophysical parameters, such as pore type, which may serve as a type of facies. After facies are identified, a mathematical equation (SR model) is developed for each facies using SR method. The above approach is performed iteratively. The initial facies can be assigned by using mixed gaussian component models, in which each facies is a gaussian distribution. The parameters of the gaussian distribution can be assigned randomly or can be estimated by domain experts for better results. After SR models are determined for each facies, each data point is evaluated and assigned to a facies whose predicted value of SR model associated to the facies is closest to the target value. The gaussian distribution of each facies is refined based on newly assigned data point to the facies. The SR model is developed with SR method based on the refined facies. The iterative approach is stopped if certain criteria is met, such as the changes of the parameters of the gaussian distributions are less than certain threshold, the SR models are not changed.

Finally, users always need to select a best interpretation model to use. Ideally, a desired petrophysical model should have robust function, superior performance, and preferably simple equation form. However, it is not usually possible for a model to achieve all the benefits for heterogeneous complex formations. A more complex equation will generally have better performance. If the pool of function forms is expanded in the initial selection, more and more mathematically complex expressions can be obtained as the final predicted equation. A model discrimination criterion may be used to decide whether it is worthy of using a more mathematically complex function form.

The approach described above may generate varying degrees of mathematical complexity depending on the form of the resulting equation. Users may therefore select the final model (and corresponding equation) based on the desired level(s) of (1) mathematical (equation) complexity, (2) measurement complexity, and (3) performance of the equation, e.g., according to a statistical measure of variance, such as, but not limited to, $R^2$.

Figure 14:
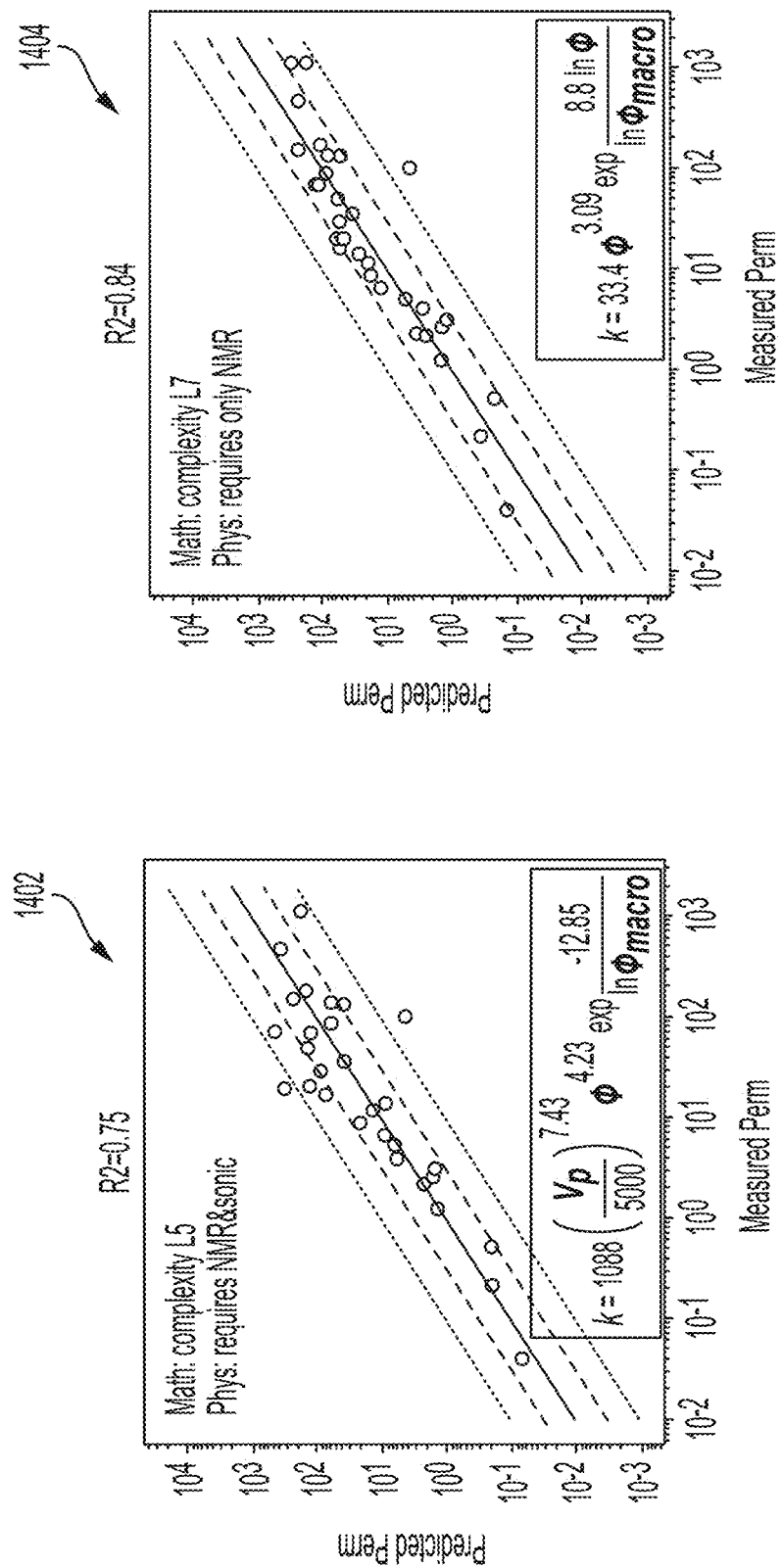
FIG. 14 is a diagram of two plot graphs illustrating different complexities of two corresponding petrophysical models for estimating permeability.

FIG. 14 is a diagram of two plot graphs 1402 and 1404 illustrating different complexities of two corresponding petrophysical models for estimating permeability. As shown in FIG. 14, the model corresponding to plot graph 1402 has an equation (or mathematical) complexity of level 5 (or "L5") and a measurement complexity that requires both NMR and sonic logging measurements. The model corresponding to plot graph 1404, on the other hand, has a slightly higher equation complexity of level 7 (or "L7") and a slightly lower measurement complexity, as it only needs NMR logging measurements. Although the model corresponding to plot graph 1402 has a lower equation complexity (and may be represented using a simpler mathematical expression), the model corresponding to plot graph 1404 is much simpler in terms of measurement requirements and has better performance with $R^2=0.84$ (versus the model corresponding to plot graph 1402 with $R^2=0.75$). After taking all of these into consideration, the petrophysical model and associated interpretation equation corresponding to plot graph 1404 may be selected as the recommended or optimal target petrophysical model.

FIGS. 15-21C provide additional examples of applying the symbolic regression (SR) modeling workflow, e.g., using processes 400, 500, and 600 of FIGS. 4, 5, and 6, respectively. As described above, such a workflow may be used to derive target petrophysical models and corresponding mathematical expressions, e.g., fluid property equations, representing fluid properties of a reservoir formation. In the following examples, it is assumed that measurements of the fluid properties may be obtained from a global fluid property database. Such a database may include, for example, different fluid properties for a multitude of live oil samples collected from petroleum producing reservoirs located in different parts of the world. As will be described in further detail below, the disclosed symbolic regression modeling techniques may be used to develop mathematical expressions/equations representing various petrophysical properties, including, but not limited to, solution gas-oil ratio (GOR), saturated oil viscosity (also referred to herein as "saturated viscosity" or "saturation viscosity"), and American Petroleum Institute (API) gravity, based on the fluid property measurements obtained from the database.

FIG. 15 is a table 1500 showing input variables and target parameters that may be selected for a target petrophysical model of a reservoir formation. Table 1500 may include, for example, a set of input variables 1510 and a set of target parameters 1520. The input variables 1510 in this example may include environmental parameters 1512 and measured fluid properties 1514. As shown in FIG. 15, environmental parameters 1512 may include, but are not limited to, temperature (T) and pressure (P). Measured fluid properties 1514 may include, but are not limited to, fluid density ($\rho$), saturated compressibility ($\gamma_{sat}$), API specific gravity (° API or API°), methane ($CH_4$) density ($\rho_{CH_4}$), methane compressibility ($\gamma_{CH_4}$), and oil compressibility ($\gamma_{oil}$). One or more of the measured fluid properties 1514, e.g., fluid density, methane density, methane compressibility, and oil compressibility may be expressed as a function of one or more of the environmental parameters 1512 (i.e., temperature and/or pressure). Target parameters 1520 in this example include, but are not limited to, gas-oil ratio (GOR), saturated/saturation viscosity ($\mu_{sat}$), API gravity, or any other formation parameter to be predicted by the target petrophysical model. It should be appreciated that while target parameters 1520, such as GOR and API gravity, can be measured, such parameters can also be estimated or predicted based on other measured quantities, as will be described in further detail below with respect to FIGS. 16A and 16B. In some embodiments, the measured quantities or values of input variables

1510 and target parameters 1520 may be obtained from a global fluid property database, as described above.

Figure 16A:
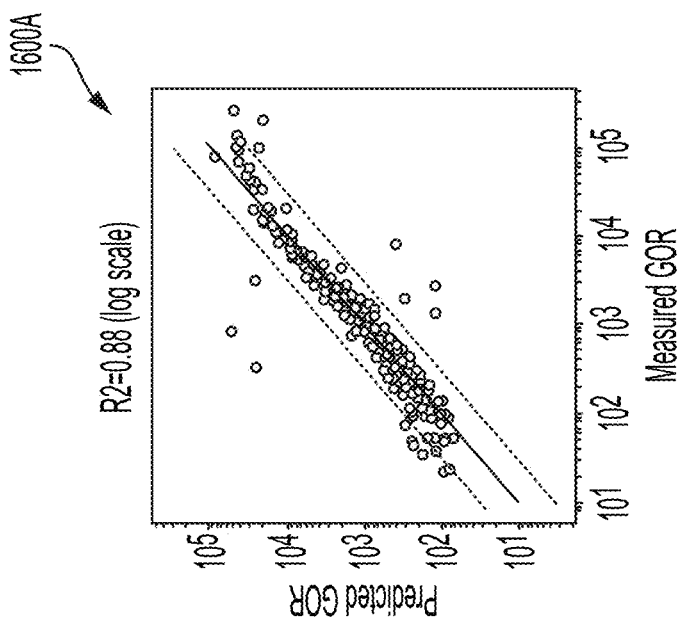
FIGS. 16A and 16B are plot graphs showing the results of two separate training instances with different termination conditions for target petrophysical models for estimating gas-oil ratio (GOR).
Figure 16B:
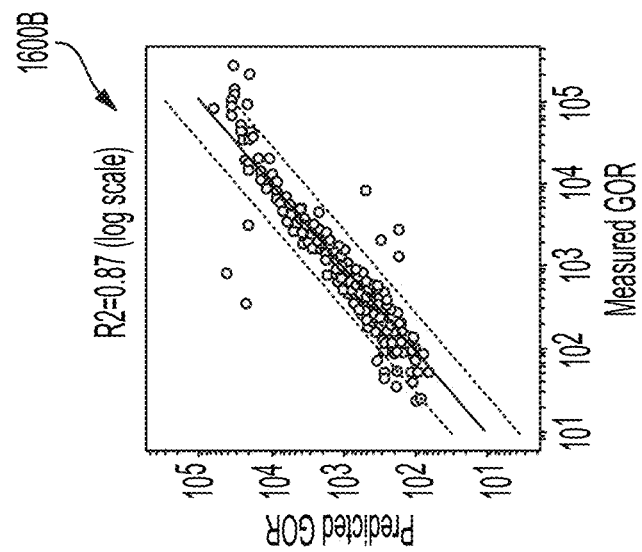

FIGS. 16A and 16B are plot graphs 1600A and 1600B showing the results of two separate training instances with different termination conditions for target petrophysical models for estimating GOR based on Equations 15 and 16 below.

$$\ln \text{GOR} = 9.36 + 1.55 \cdot \sqrt{(\log(3.42 + (P - 318.5/T)))} - 7.74 \cdot \rho \quad (15)$$

$$\ln \text{GOR} = 8.71 + 0.38 \log P - 7.33 \cdot \rho \quad (16)$$

The input variables for estimating or predicting the target parameter (GOR) using the above equations include environmental parameters (pressure P and temperature T) and a measured fluid property (fluid density p). Plot graphs 1600A and 1600B show predicted values of GOR using Equations 15 and 16, respectively, versus measured values of GOR, e.g., as obtained from the above-described fluid property database. As in FIGS. 11A-11C above, it is assumed for purposes of this example that the dots in each plot graph shown in FIGS. 16A and 16B are data points representing predicted values of the target parameter (GOR) in comparison to measured values of GOR, as shown by the solid line with a slope of 1, and that the dotted lines represent an error tolerance window or error range with a factor of two. Based on the number of data points that intersect the lines in each graph (which represent points at which the predicted values match the measured values), it is evident that the majority of the predicted GOR values are consistent with the measured GOR values. The values are less consistent for larger values of GOR in the depicted range of values and a few outliers that fall outside the error tolerance window (dotted lines) in each graph.

In some embodiments, measurements for additional input parameters or variables may be included in the training data to improve the accuracy or performance of the target model (e.g., as measured using $R^2$). The additional input parameters may include, for example, methane compressibility ($\gamma_{CH_4}$) and methane density ($\rho_{CH_4}$) for predicting GOR without accounting for environment parameters P and T, e.g., in accordance with Equation 17 below.

$$\ln \text{GOR} = 8.87 + 7.31 \cdot \rho_{CH_4} + 0.01 \text{API}^\circ - 1815 \cdot \gamma_{CH_4} - 5.22 \cdot \rho^2 - 11.2 \cdot \rho_{CH_4}^2 \quad (17)$$

Figure 17:
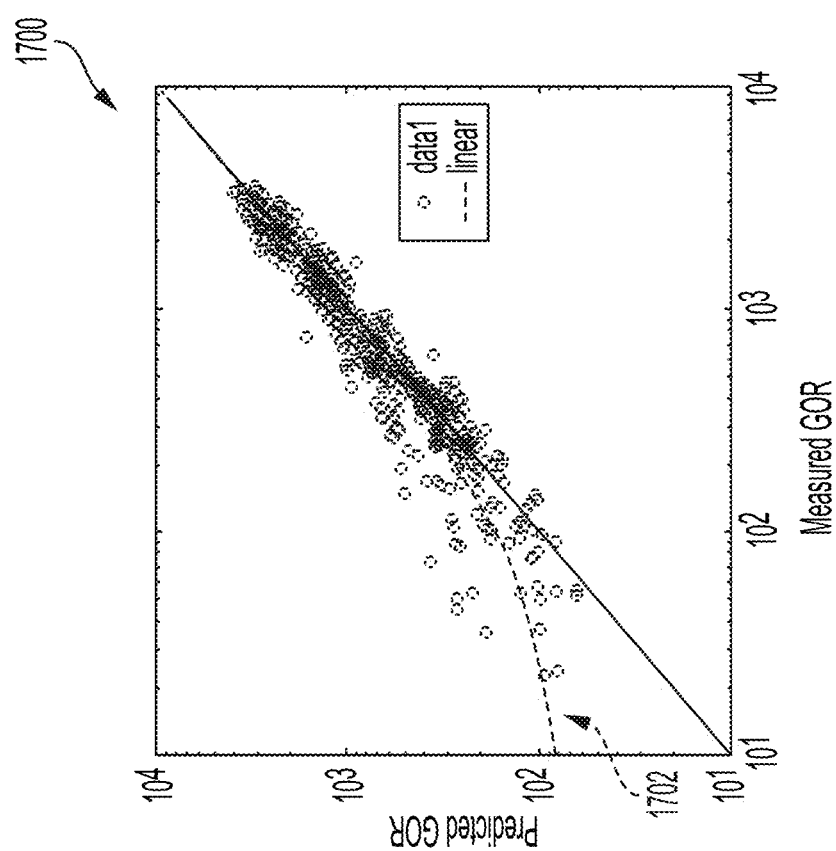
FIG. 17 is a plot graph showing predicted versus measured values of GOR that are fitted to a linear equation.

FIG. 17 is a plot graph 1700 showing predicted versus measured GOR values that are fitted to a linear equation, e.g., Equation 18 below, as depicted by a dotted curve 1702.

$$\text{GOR}_{pred} = 0.995 \cdot \text{GOR}_{meas} + 73.7 \quad (18)$$

The data in plot graph 1700 shows there is good linear correlation between the predicted GOR and measured GOR values generally. It is assumed for purposes of this example that the slope of the linear fitting curve for Equation 18 is 0.995. It is also assumed that the data points in this example are plotted according to a log-log scale to cover the entire range of GOR values while the linear fitting is performed on the original (i.e., non-log) data. The data shown in plot graph 1700 includes, for example, a range of GOR values up to 3,500 standard cubic foot per stock tank barrel (SCF/STB), which covers most of the data points. It should be appreciated the global fluid property database may include a wider range of GOR values, e.g., based on oil samples with GOR values at or above 10,000 SCF/STB.

In some embodiments, the SR modeling workflow may incorporate conditional branching to determine an optimal petrophysical model and corresponding equation that covers the entire range of available GOR data. Equation 19 below is an example of such an optimal equation that may be derived from the SR modeling workflow with conditional branching.

$$\text{GOR} = 189.13 + 7985.32 \cdot \rho_{CH_4}/(\rho \cdot \min(\rho, 0.54)) - 16725.13 \cdot \rho_{CH_4} \quad (19)$$

Figure 18B:
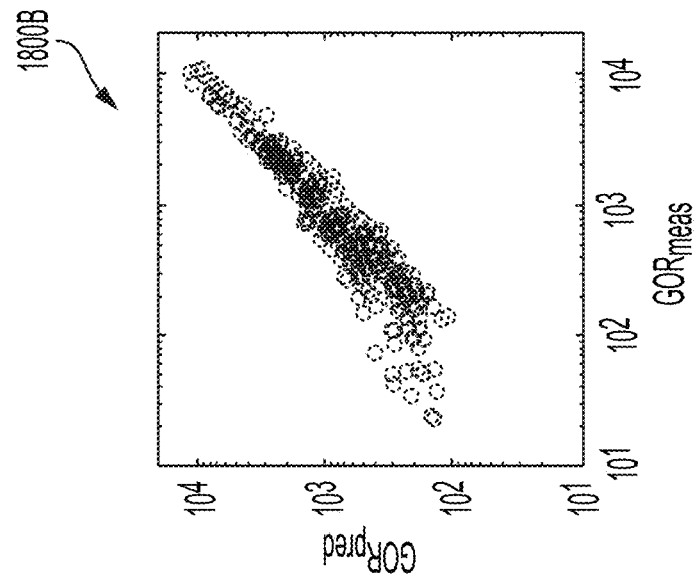
FIGS. 18A and 18B are plot graphs showing measured versus predicted values of GOR on a linear scale and a log-log scale, respectively.
Figure 18A:
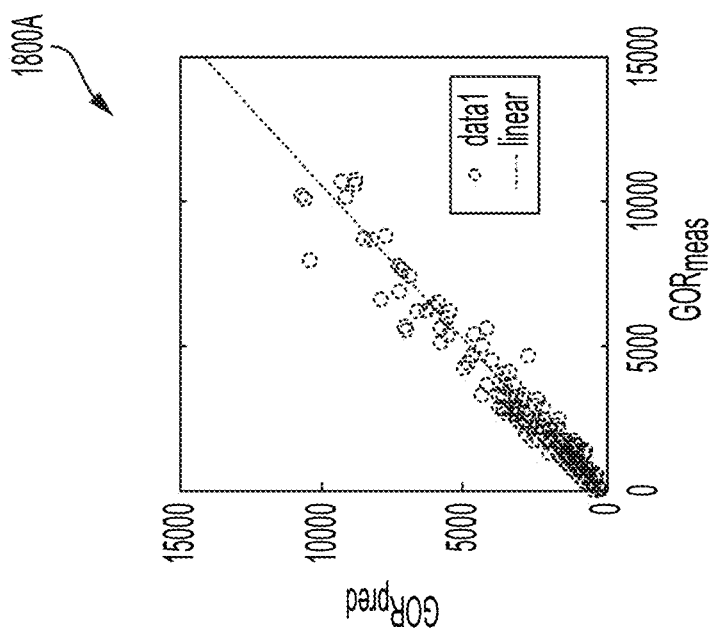

FIGS. 18A and 18B are plot graphs 1800A and 1800B showing measured versus predicted values of GOR using Equation 19 for an untruncated value range on a linear scale and a log-log scale, respectively. The current benchmark GOR equation that is widely used in the industry is the Standing Equation. The relative error of predicted GOR values using the Standing Equation has been estimated to be approximately 20%, e.g., as defined by the root mean square error (RMSE) of predicted values over a specified range. The specified range in this instance may be calculated from four times (4×) the standard deviation of a target data span, e.g., based on measured values of GOR available from a proprietary or industry-wide fluid property database. By comparison, the relative error of the GOR predictions made using Equations 18 and 19 have been shown to be significantly less than 20%, i.e., approximately 7.81% and 5%, respectively. As will be described in further detail below, a relatively low error rate may also be shown for predicted values of other target parameters based on target equations derived from the disclosed SR modeling techniques.

Figure 19B:
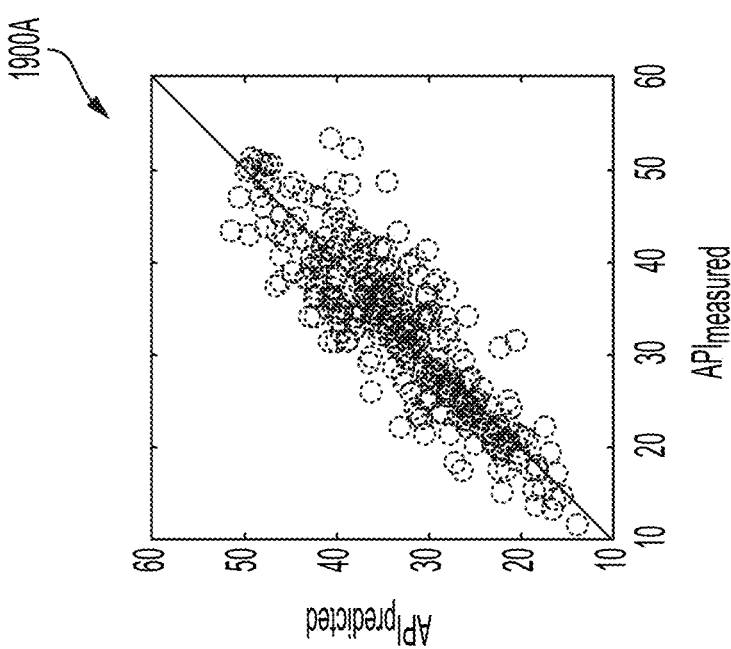
FIGS. 19A and 19B are plot graphs showing measured versus predicted values of API specific gravity (° API) based on measured quantities of input variables obtained from a fluid property database.
Figure 19A:
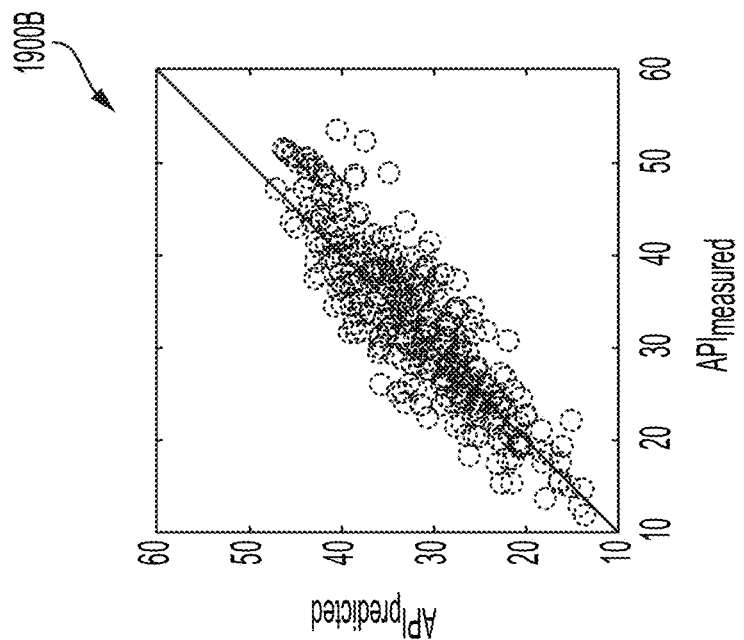

FIGS. 19A and 19B are plot graphs 1900A and 1900B showing measured versus predicted values of API specific gravity (° API) based on measured quantities of input variables obtained from a fluid property database, as described above. The predicted values in plot graphs 1900A and 1900B may be obtained using, for example, Equations 20 and 21, respectively:

$$°\text{API} = 158 + 0.0125 \cdot P \cdot T - 0.003 \cdot P - 0.081 \cdot T - 136.8 \cdot \rho - 183.9 \cdot \rho_{CH_4} - 8252 \cdot \gamma_{CH_4} - 2.40 \times 10^{-7} \cdot P^2 \cdot \rho \quad (20)$$

$$°\text{API} = 31.9 + 9547 \cdot \gamma_{CH_4} + 57.4 \cdot 5.62 \cdot P \cdot \gamma_{CH_4} - 26.9 \cdot T \cdot \gamma_{CH_4} - 66.2 \cdot \rho^2 - 114537 \cdot \rho_{CH_4} \quad (21)$$

Like plot graphs 1800A and 1800B of FIGS. 18A and 18B, described above, plot graphs 1900A and 1900B include very few, if any, outliers, which indicates that the predictions produced by the corresponding equations are relatively robust. In some embodiments, Equations 20 and 21 may be independently derived using the SR modeling workflow described above. For example, these two equations may be selected from a population of candidate models generated during independent training runs.

In some embodiments, the SR modeling workflow may include applying ensemble modeling to the target models corresponding to Equations 20 and 21 to generate an optimal target model and corresponding equation for predicting API specific gravity. The ensemble modeling may involve, for example, averaging the two models by taking an arithmetic mean of the corresponding equations or predictions thereof.

Figure 20:
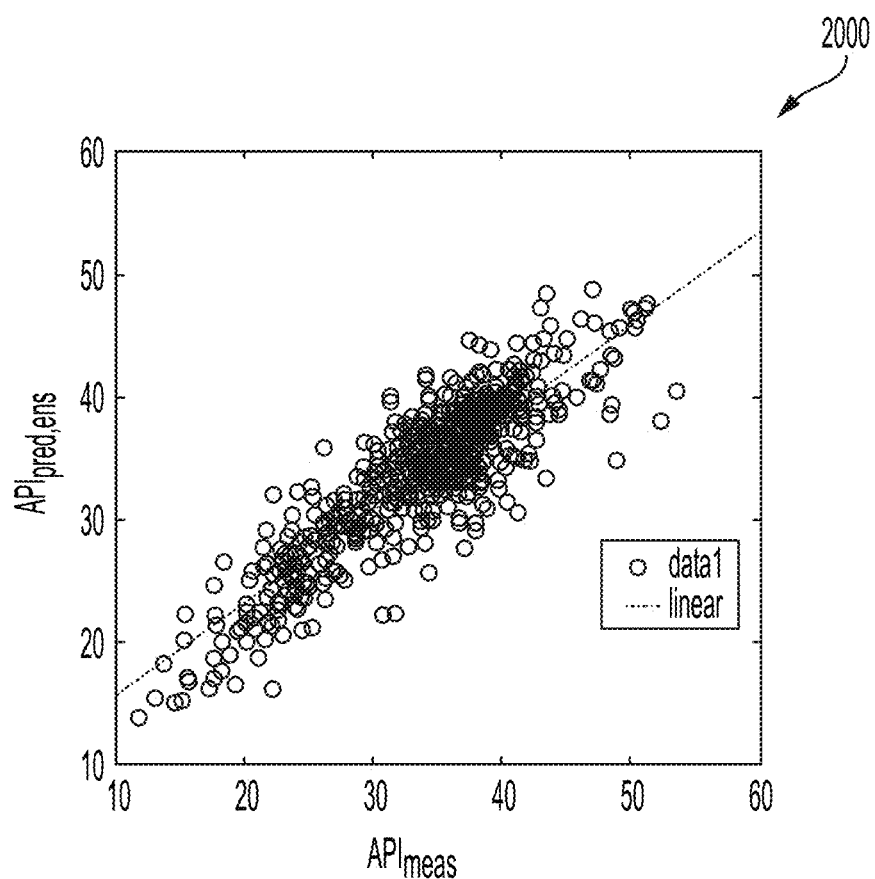
FIG. 20 is a plot graph showing the results of an ensemble model produced by combining two separate models.

FIG. 20 is a plot graph 2000 showing the results of the ensemble model produced by combining the models corresponding to Equations 20 and 21. The results in plot graph 2000 show that the ensemble model narrows the distribution of values and improves the error rate relative to the individual model results shown in plot graphs 1900A and 1900B of FIGS. 19A and 19B.

Figure 21A:
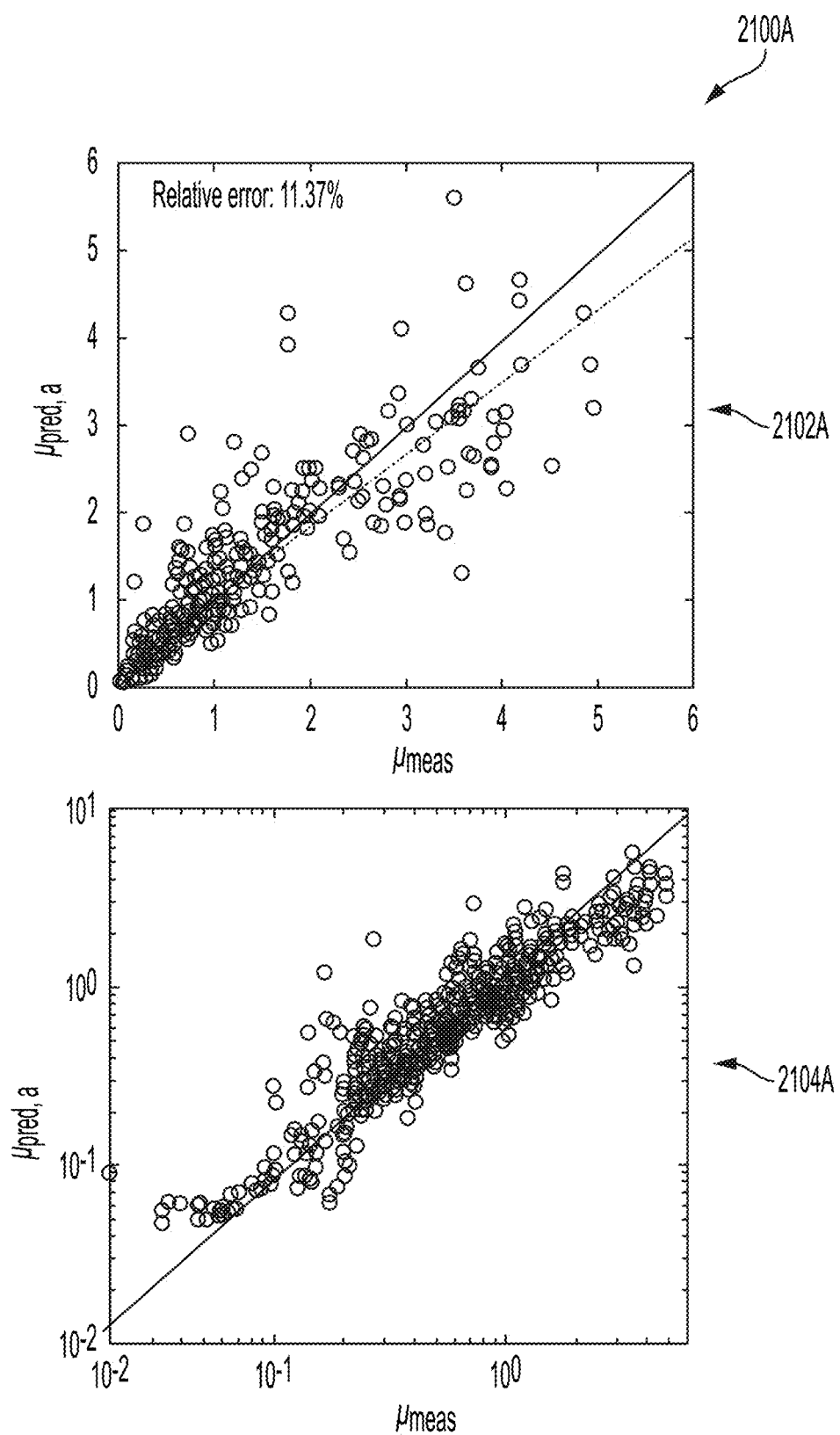
FIGS. 21A, 21B, and 21C are plot graphs showing the prediction results and relative errors for target models and corresponding equations for values of saturated viscosity.
Figure 21B:
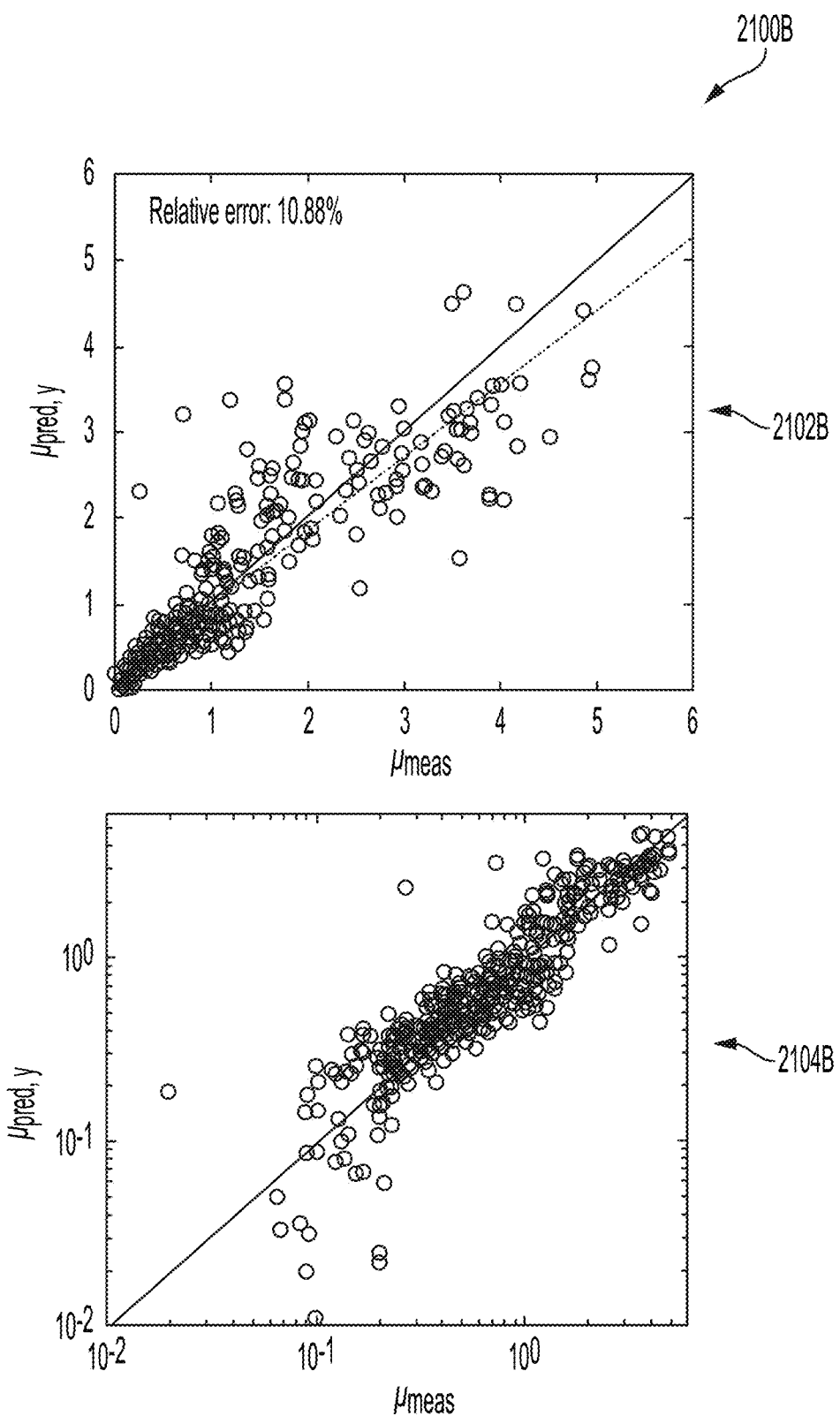
Figure 21C:
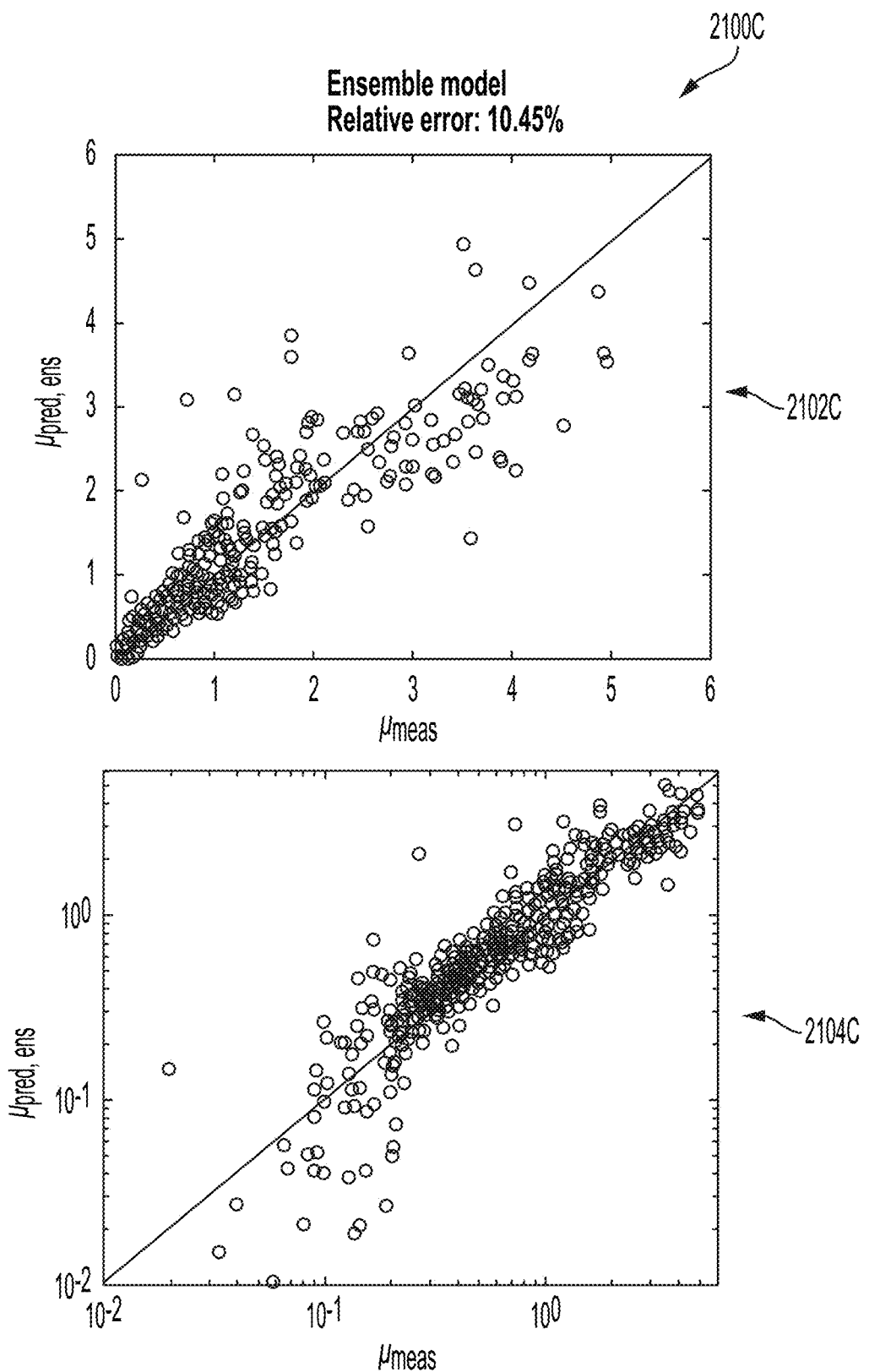

In addition to GOR and API specific gravity, saturated viscosity ($\mu_{sat}$ or $\mu$) is another target parameter that the disclosed SR modeling workflow may be used to predict based on the measurements of live oil samples obtained from the global fluid property database, as described above. FIGS. 21A-21C are plot graphs showing the prediction results and relative errors for target models and corresponding equations for values of saturated viscosity. As in the API specific gravity example above, an ensemble modeling technique may be applied to various prediction models generated for saturated viscosity to produce an optimal or final prediction model. FIGS. 21A and 21B are different sets of plot graphs 2100A and 2100B that show the resulting predicted vs. measured viscosity data for two different models, where plot graphs 2102A and 2102B show the results and relative error rates on a linear scale, while plot graphs 2104A and 2104B show the results and relative error on a log scale.

FIG. 21C is a set of plot graphs 2100C that show the predicted vs. measured viscosity data, on a linear scale (plot graph 2102C) and a log scale (plot graph 2104C), for an ensemble model derived from the two models corresponding to FIGS. 21A and 21B, e.g., by taking a weighted average of the two models. A comparison of the ensemble model results shown in FIG. 21C with those of the individual model results shown in FIGS. 21A and 21B reveals that the ensemble procedure not only reduces the relative error but also significantly reduces the amount of data scattering.

Figure 22:
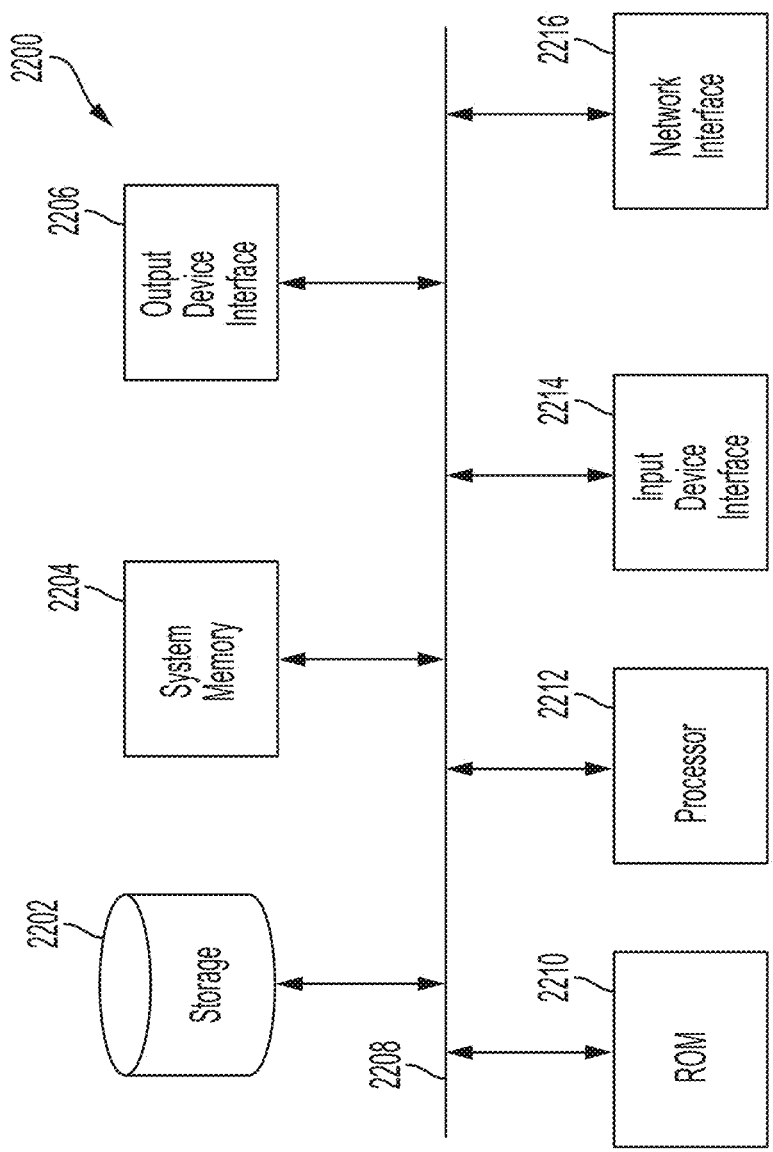
FIG. 22 is a block diagram of an illustrative computer system in which embodiments of the present disclosure may be implemented.

FIG. 22 is a block diagram of an illustrative computer system 2200 in which embodiments of the present disclosure may be implemented. For example, the functions, components, and/or operations of processing system 119, computing system 1040, or memory 121 of FIG. 1, system 300 of FIG. 3, and processes 400, 500, and 600 of FIGS. 4, 5, and 6, respectively, as described above, may be implemented using system 2200. System 2200 can be a computer, phone, PDA, or any other type of electronic device. Such an electronic device includes various types of computer readable media and interfaces for various other types of computer readable media. As shown in FIG. 22, system 2200 includes a permanent storage device 2202, a system memory 2204, an output device interface 2206, a system communications bus 2208, a read-only memory (ROM) 2210, processing unit(s) 2212, an input device interface 2214, and a network interface 2216.

Bus 2208 collectively represents all system, peripheral, and chipset buses that communicatively connect the numerous internal devices of system 2200. For instance, bus 2208 communicatively connects processing unit(s) 2212 with ROM 2210, system memory 2204, and permanent storage device 2202.

From these various memory units, processing unit(s) 2212 retrieves instructions to execute and data to process in order to execute the processes of the subject disclosure. The processing unit(s) can be a single processor or a multi-core processor in different implementations.

ROM 2210 stores static data and instructions that are needed by processing unit(s) 2212 and other modules of system 2200. Permanent storage device 2202, on the other hand, is a read-and-write memory device. This device is a non-volatile memory unit that stores instructions and data even when system 2200 is off. Some implementations of the subject disclosure use a mass-storage device (such as a magnetic or optical disk and its corresponding disk drive) as permanent storage device 2202.

Other implementations use a removable storage device (such as a floppy disk, flash drive, and its corresponding disk drive) as permanent storage device 2202. Like permanent storage device 2202, system memory 2204 is a read-and-write memory device. However, unlike storage device 2202, system memory 2204 is a volatile read-and-write memory, such a random-access memory. System memory 2204 stores some of the instructions and data that the processor needs at runtime. In some implementations, the processes of the subject disclosure are stored in system memory 2204, permanent storage device 2202, and/or ROM 2210. For example, the various memory units include instructions for implementing the symbolic regression model, for training the symbolic regression model, and/or for estimating a property of the reservoir formation based on a model (e.g., mathematical expression) output by the symbolic regression model, in accordance with embodiments of the present disclosure, e.g., according to the symbolic regression and formation modeling operations performed by system 300 of FIG. 3 using processes 400, 500, and 600 of FIGS. 4, 5, and 6, respectively, as described above. From these various memory units, processing unit(s) 2212 retrieves instructions to execute and data to process in order to execute the processes of some implementations.

Bus 2208 also connects to input and output device interfaces 2214 and 2206, respectively. Input device interface 2214 enables the user to communicate information and select commands to the system 2200. Input devices used with input device interface 2214 include, for example, alphanumeric, QWERTY, or T9 keyboards, microphones, and pointing devices (also called "cursor control devices"). Output device interface 2206 enables, for example, the display of images generated by the system 2200. Output devices used with output device interface 2206 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 22, bus 2208 also couples system 2200 to a public or private network (not shown) or combination of networks through a network interface 2216. Such a network may include, for example, a local area network ("LAN"), such as an Intranet, or a wide area network ("WAN"), such as the Internet. Any or all components of system 2200 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, processes 400 and 500 of FIGS. 4 and 5, respectively, as described above, may be implemented using system 2200 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

While specific details about the above embodiments have been described, the above hardware and software descriptions are intended merely as example embodiments and are not intended to limit the structure or implementation of the disclosed embodiments. For instance, although many other internal components of the system 2200 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method comprising:
receiving, by a computing device from one or more formation evaluation sensors, measurements of formation parameters during a first stage of a downhole operation within a reservoir formation;
determining, by the computing device, a correlation between each of the formation parameters and a target parameter of the reservoir formation, based on the received measurements;
selecting, by the computing device, one or more of the formation parameters as input parameters for a symbolic regression model, based on the correlation determined for each formation parameter;
training, by the computing device, a symbolic regression model to generate a plurality of candidate formation models representing the target parameter of the reservoir formation, based on the selected input parameters;
applying, by the computing device, one or more optimizations to the plurality of candidate formation models to determine a target petrophysical model of the reservoir formation; and
estimating, by the computing device, values of the target parameter for at least one layer of the reservoir formation, based on the target petrophysical model,
wherein a second stage of the downhole operation is performed within the at least one layer of the reservoir formation, based on the estimated values of the target parameter.

2. The computer-implemented method of claim 1, wherein each candidate formation model is a mathematical expression representing the target parameter of the reservoir formation, and the input parameters include a set of primitives for the symbolic regression model to generate the mathematical expression for each candidate formation model.

3. The computer-implemented method of claim 2, wherein the set of primitives are selected for the symbolic regression model based on measurement characteristics of the one or more measurement tools.

4. The computer-implemented method of claim 2, wherein applying the one or more optimizations comprises:
determining that each of the plurality of candidate formation models fails to achieve a model performance criterion; and
generating the target petrophysical model of the reservoir formation as an ensemble of the plurality of candidate formation models, based on the determination.

5. The computer-implemented method of claim 2, wherein the plurality of candidate formation models correspond to a plurality of facies associated with the reservoir formation, the set of primitives further include a set of branching conditions, each candidate formation model is generated by the symbolic regression model using the set of branching conditions for a corresponding one of the plurality of facies, and the set of branching conditions includes one or more conditional operators for the symbolic regression model to generate the mathematical expression for each candidate formation model.

6. The computer-implemented method of claim 5, wherein training the symbolic regression model comprises:
generating a parent population of formation models;
performing at least one of a crossover operation or a mutation operation on the parent population to generate the plurality of candidate formation models over a plurality of iterations until a predetermined termination condition is reached; and
selecting one of the candidate formation models from the set as the target petrophysical model for the corresponding facies, based on a predetermined fitness objective.

7. The computer-implemented method of claim 6, wherein selecting one of the candidate formation models comprises:
ranking each candidate formation model of the plurality of candidate formation models according to the predetermined fitness objective; and
selecting the target petrophysical model from the plurality of candidate formation models, based on the ranking.

8. The computer-implemented method of claim 7, wherein the ranking comprises:
calculating, for each of the candidate formation models in the set, a score for each of a plurality of factors associated with the predetermined fitness objective; and
calculating, for each of the candidate formation models in the set, an overall score for the plurality of factors based on the score calculated for each factor, wherein at least one candidate formation model having a highest overall score is selected from the set as the target petrophysical model.

9. The computer-implemented method of claim 8, wherein the plurality of factors includes one or more of: a mathematical complexity; a measurement complexity; a physics complexity; and a model performance criterion.

10. The computer-implemented method of claim 9, wherein the model performance criterion is a root mean square error between the estimated values of the target parameter and measured values of the target parameter.

11. A system comprising:
at least one processor; and
a memory coupled to the at least one processor having instructions stored therein, which when executed by the processor, cause the at least one processor to perform a plurality of operations, including operations to:
receive, from one or more formation evaluation sensors, measurements of formation parameters during a first stage of a downhole operation within a reservoir formation;
determine a correlation between each of the formation parameters and a target parameter of the reservoir formation, based on the received measurements;

select one or more of the formation parameters as input parameters for a symbolic regression model, based on the correlation determined for each formation parameter;

train a symbolic regression model to generate a plurality of candidate formation models representing the target parameter of the reservoir formation, based on the selected input parameters;

apply one or more optimizations to the plurality of candidate formation models to determine a target petrophysical model of the reservoir formation; and estimate values of the target parameter for at least one layer of the reservoir formation, based on the target petrophysical model, wherein a second stage of the downhole operation is performed within the at least one layer of the reservoir formation based on the estimated values of the target parameter.

12. The system of claim 11, wherein each candidate formation model is a mathematical expression representing the target parameter of the reservoir formation, and the input parameters include a set of primitives for the symbolic regression model to generate the mathematical expression for each candidate formation model.

13. The system of claim 12, wherein the set of primitives are selected for the symbolic regression model based on measurement characteristics of the one or more measurement tools.

14. The system of claim 12, wherein the operations performed by the at least one processor further comprise operations to:

determine that each of the plurality of candidate formation models fails to achieve a model performance criterion; and generate the target petrophysical model of the reservoir formation as an ensemble of the plurality of candidate formation models, based on the determination.

15. The system of claim 12, wherein the plurality of candidate formation models correspond to a plurality of facies associated with the reservoir formation, the set of primitives further include a set of branching conditions, each candidate formation model is generated by the symbolic regression model using the set of branching conditions for a corresponding one of the plurality of facies, and the set of branching conditions includes one or more conditional operators for the symbolic regression model to generate the mathematical expression for each candidate formation model.

16. The system of claim 15, wherein the operations performed by the at least one processor further comprise operations to:

generate a parent population of formation models;

perform at least one of a crossover operation or a mutation operation on the parent population to generate the plurality of candidate formation models over a plurality of iterations until a predetermined termination condition is reached; and select one of the candidate formation models from the set as the target petrophysical model for the corresponding facies, based on a predetermined fitness objective.

17. The system of claim 16, wherein the operations performed by the at least one processor further comprise operations to:

rank each candidate formation model of the plurality of candidate formation models according to the predetermined fitness objective; and select the target petrophysical model from the plurality of candidate formation models, based on the ranking.

18. The system of claim 17, wherein the operations performed by the at least one processor further comprise operations to:

calculate, for each of the candidate formation models in the set, a score for each of a plurality of factors associated with the predetermined fitness objective; and calculate, for each of the candidate formation models in the set, an overall score for the plurality of factors based on the score calculated for each factor, wherein at least one candidate formation model having a highest overall score is selected from the set as the target petrophysical model.

19. The system of claim 18, wherein the plurality of factors includes one or more of: a mathematical complexity; a measurement complexity; a physics complexity; and a model performance criterion.

20. A non-transitory computer-readable medium having instructions stored thereon, which, when executed by a computer, cause the computer to perform a plurality of operations, including operations to:

receive, from one or more formation evaluation sensors, measurements of formation parameters during a first stage of a downhole operation within a reservoir formation;

determine a correlation between each of the formation parameters and a target parameter of the reservoir formation, based on the received measurements;

select one or more of the formation parameters as input parameters for a symbolic regression model, based on the correlation determined for each formation parameter;

train a symbolic regression model to generate a plurality of candidate formation models representing the target parameter of the reservoir formation, based on the selected input parameters;

apply one or more optimizations to the plurality of candidate formation models to determine a target petrophysical model of the reservoir formation; and estimate values of the target parameter for at least one layer of the reservoir formation, based on the target petrophysical model, wherein a second stage of the downhole operation is performed within the at least one layer of the reservoir formation based on the estimated values of the target parameter.

* * * * *